US012222818B2

(12) United States Patent
Park et al.

(10) Patent No.: US 12,222,818 B2
(45) Date of Patent: Feb. 11, 2025

(54) ELECTRONIC DEVICE AND METHOD FOR TRANSFERING DATA OF WEARABLE DEVICE

(71) Applicant: SAMSUNG ELECTRONICS CO., LTD., Suwon-si (KR)

(72) Inventors: Sanghyun Park, Suwon-si (KR); Taikuin Mun, Suwon-si (KR); Gunho Lee, Suwon-si (KR); Jaehyeok Lee, Suwon-si (KR); Taesub Kim, Suwon-si (KR); Heangsu Kim, Suwon-si (KR); Myungkeun Oh, Suwon-si (KR); Seunghyup Lee, Suwon-si (KR); Hwansoo Jeon, Suwon-si (KR); Hakbong Cho, Suwon-si (KR); Sunghyun An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 57 days.

(21) Appl. No.: 18/112,702

(22) Filed: Feb. 22, 2023

(65) Prior Publication Data
US 2023/0267051 A1 Aug. 24, 2023

Related U.S. Application Data

(63) Continuation of application No. PCT/KR2023/000558, filed on Jan. 12, 2023.

(30) Foreign Application Priority Data

Feb. 23, 2022 (KR) .................. 10-2022-0023710

(51) Int. Cl.
H04L 67/12 (2022.01)
G06F 1/16 (2006.01)
(Continued)

(52) U.S. Cl.
CPC ........ *G06F 11/1458* (2013.01); *G06F 1/1626* (2013.01); *H04L 67/12* (2013.01); *H04L 67/141* (2013.01); *G06F 2201/84* (2013.01)

(58) Field of Classification Search
None
See application file for complete search history.

(56) References Cited

U.S. PATENT DOCUMENTS 8,737,967 B2  5/2014  Osborne et al.
10,185,475 B2  1/2019  Choi et al.
(Continued)

FOREIGN PATENT DOCUMENTS

KR  10-2010-0049623  5/2010
KR  10-2013-0077192  7/2013
(Continued)

OTHER PUBLICATIONS

Written Opinion dated Apr. 10, 2023 in International Patent Application No. PCT/KR2023/000558.
(Continued)

Primary Examiner — Kamal M Hossain
(74) Attorney, Agent, or Firm — Nixon & Vanderhye, P.C.

(57) ABSTRACT

A method and a device configured to transmit information related to a device to a first electronic device through a communication module in accordance with a request of the first electronic device; establish a communication connection with a second electronic device based on the information; receive a backup request for data stored in the device from the first electronic device; generate backup data based on the backup request; transmit the generated backup data to the second electronic device; and reset the device based on a device reset request in a case of receiving the device reset request from the second electronic device.

18 Claims, 14 Drawing Sheets

(51) Int. Cl.
    *G06F 11/14*     (2006.01)
    *H04L 67/141*     (2022.01)

(56) References Cited

U.S. PATENT DOCUMENTS

| | | |
|---|---|---|
| 11,671,250 B2 | 6/2023 | Donley et al. |
| 2009/0034591 A1 | 2/2009 | Julian et al. |
| 2014/0025638 A1* | 1/2014 | Hu ............... H04L 67/5683 |
| | | 707/654 |
| 2015/0067398 A1 | 3/2015 | Lee |
| 2016/0219424 A1 | 7/2016 | Xu |
| 2018/0352435 A1* | 12/2018 | Donley ............... H04W 12/062 |
| 2021/0208976 A1 | 7/2021 | Guan |

FOREIGN PATENT DOCUMENTS

| | | |
|---|---|---|
| KR | 10-2015-0025302 | 3/2015 |
| KR | 10-2015-0100181 | 9/2015 |
| KR | 10-2013373 | 8/2019 |
| KR | 10-2209814 | 2/2021 |
| KR | 10-2022-0011066 | 1/2022 |

OTHER PUBLICATIONS

Search Report dated Apr. 10, 2023 in International Patent Application No. PCT/KR2023/000558.

* cited by examiner

ELECTRONIC DEVICE AND METHOD FOR TRANSFERING DATA OF WEARABLE DEVICE

CROSS-REFERENCE TO RELATED APPLICATIONS

This application is a continuation of International Application No. PCT/KR2023/000558 designating the United States, filed on Jan. 12, 2023, in the Korean Intellectual Property Receiving Office and claiming priority to Korean Patent Application 10-2022-0023710, filed on Feb. 23, 2022, in the Korean Intellectual Property Office, the disclosures of each of which are incorporated by reference herein in their entireties.

BACKGROUND

Field

The disclosure relates to a data transfer method of a wearable device and an electronic device.

Description of Related Art

With the development of digital technology, various types of electronic devices such as a mobile communication terminal, a personal digital assistant (PDA), an electronic notebook, a smart phone, a tablet PC (personal computer), or a wearable device are used widely. In order to support and increase functions of such electronic devices, the hardware part and/or the software part of the electronic device are/is improved continuously.

An electronic device (e.g., a mobile phone) may exchange information by connecting with an external device (or external output device) such as a laptop computer, earphone, or headphone using a short-range wireless communication technology (e.g., Bluetooth). A user may change to a second electronic device (e.g., a new smart phone) after connecting and using a wearable device (e.g., a watch) with the first electronic device (e.g., a previous smart phone). To connect the wearable device to the second electronic device, it may be necessary to perform a mutual discovery process and a mutual key authentication process with the second electronic device after unpairing and resetting with the first electronic device.

SUMMARY

In a case that the first electronic device is changed to the second electronic device, data stored in the first electronic device may be moved to the second electronic device. However, a method of moving data (e.g., photo, music, watch face) stored in the wearable device used in connection with the first electronic device to the second electronic device is not provided. In order to connect the wearable device to the second electronic device, resetting the wearable device is essential, but a user may not know that the wearable device can be connected to the second electronic device only by resetting the wearable device. Since all pieces of data stored in the wearable device are deleted in the case that the wearable device is reset, it is necessary to back up data stored in the wearable device before resetting the wearable device.

In embodiments of the disclosure, in a case that a wearable device is connected to and used with a first electronic device (e.g., an old phone) and the first electronic device is replaced with a second electronic device (e.g., a new phone), a method and a device for resetting the wearable device after moving data stored in the wearable device to the second electronic device and restoring data of the wearable device with backup data stored in the second electronic device may be provided.

A device according to various embodiments of the disclosure may include a communication module, a memory, and a processor operatively connected to at least one of the communication module or the memory, wherein the processor is configured to transmit information related to the device to a first electronic device through the communication module in accordance with a request of the first electronic device; establish a communication connection with a second electronic device based on the information; receive a backup request for data stored in the device from the first electronic device; generate backup data based on the backup request; transmit the generated backup data to the second electronic device; and reset the device based on a device reset request in a case of receiving the device reset request from the second electronic device.

An electronic device according to various embodiments of the disclosure may include a communication module, a memory, and a processor operatively connected to at least one of the communication module or the memory, wherein the processor may be controlled to establish a communication connection with an external electronic device through the communication module; receive information related to a device from the external electronic device; establish a communication connection with the device based on the information; receive backup data based on a backup request for data stored in the device; store the received backup data in the memory; request a device reset to the device; and reset the device.

A method of operating an electronic device according to various embodiments of the disclosure may include establishing a communication connection with an external electronic device through a communication module included in the electronic device; receiving information related to a device from the external electronic device; establishing a communication connection with the device based on the information; receiving backup data based on a backup request for data stored in the device; storing the received backup data in a memory; and requesting a device reset to the device and controlling the device to be reset.

According to various embodiments, in a case that the first electronic device is changed to the second electronic device, a wearable device used by connecting to the first electronic device may be connected conveniently to the second electronic device and be used.

According to various embodiments, even in a case that the wearable device is reset to connect with the second electronic device, the second electronic device and the wearable device may be connected without data stored in the wearable device being lost. This may allow the user to conveniently disconnect the first electronic device from the wearable device and to connect the second electronic device to the wearable device.

According to various embodiments, in a case that data stored in the wearable device gets stored in the second electronic device, the user may be guided to reset the wearable device so that the user can connect conveniently the second electronic device and the wearable device.

According to various embodiments, battery consumption of the first electronic device may be reduced by transmitting directly data stored in the wearable device to the second electronic device without going through the first electronic device.

According to various embodiments, transmission efficiency may be increased and power consumption may be reduced using different communication methods in accordance with the data to be transmitted in such a way that information with a small data capacity (such as a reset request) may use a first communication method (e.g., low-power Bluetooth), and information with a large data capacity (such as backup data) may use a second communication method (e.g., WiFi).

According to various embodiments, a continuous user experience for the wearable device may be provided by transferring the data backed up in the second electronic device to the wearable device and restoring the data of the wearable device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
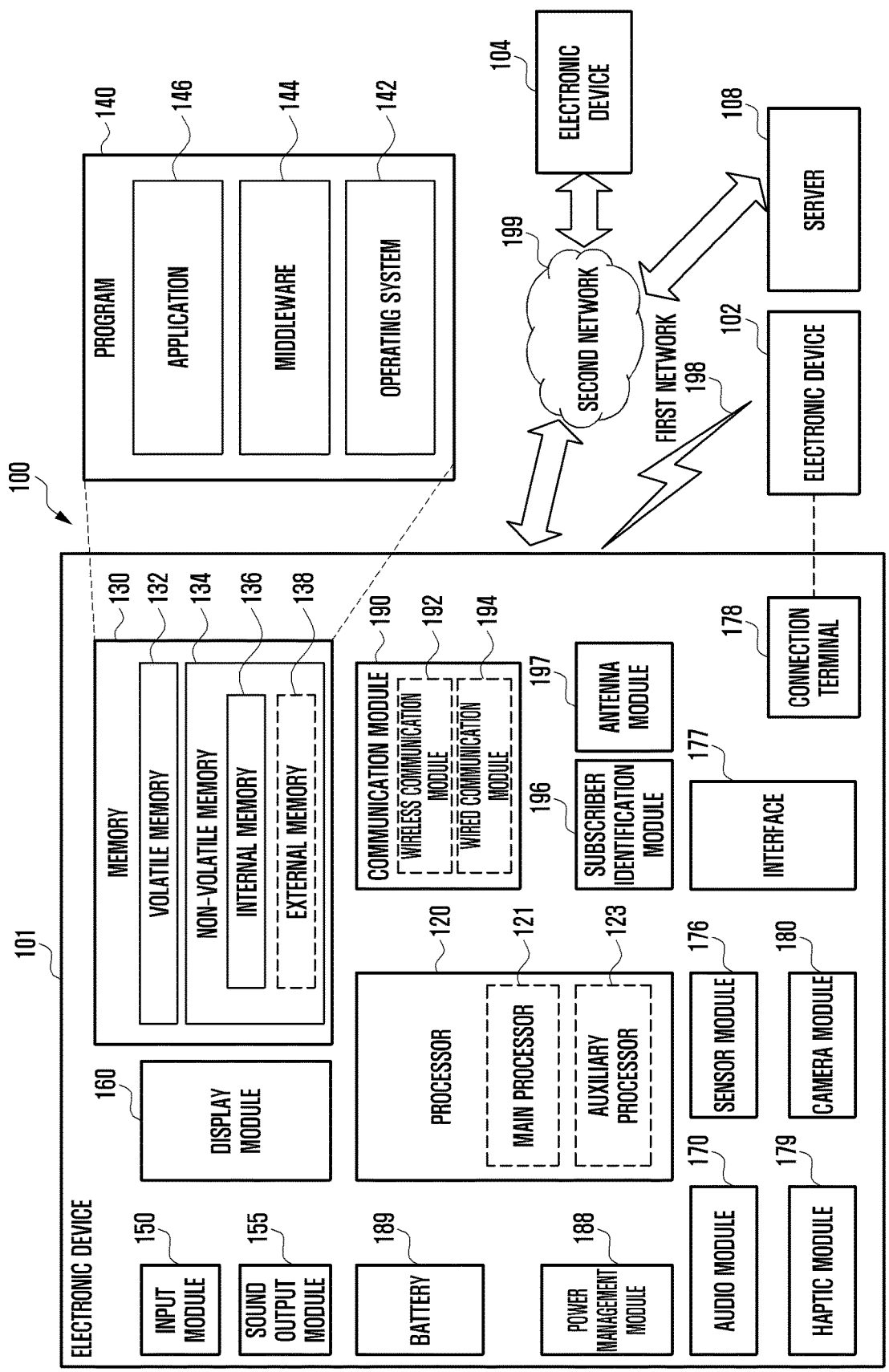
FIG. 1 is a block diagram of an example electronic device in a network environment according to various embodiments.

FIG. 1 is a block diagram illustrating an example electronic device 101 in a network environment 100 according to various embodiments.

With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and do not limit the components in other aspects (e.g., importance or order). It is to be understood that if an element (e.g., the first element) is referred to, with or without the term "operatively" or "communicatively", as "coupled with", "coupled to", "connected with", or "connected to" another element (e.g., the second element), the element may be coupled with the other element directly (e.g., wiredly), wirelessly, or via the third element.

As used in connection with various embodiments of the disclosure, the term "module" may include a unit implemented in hardware, software, or firmware, or any combination thereof, and may interchangeably be used with other terms, for example, "logic", logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium which is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program or another component may be carried out sequentially, in parallel, repeatedly, or heuristically, or one or more of the operations may be executed in a different order or omitted, or one or more other operations may be added.

Figure 2:
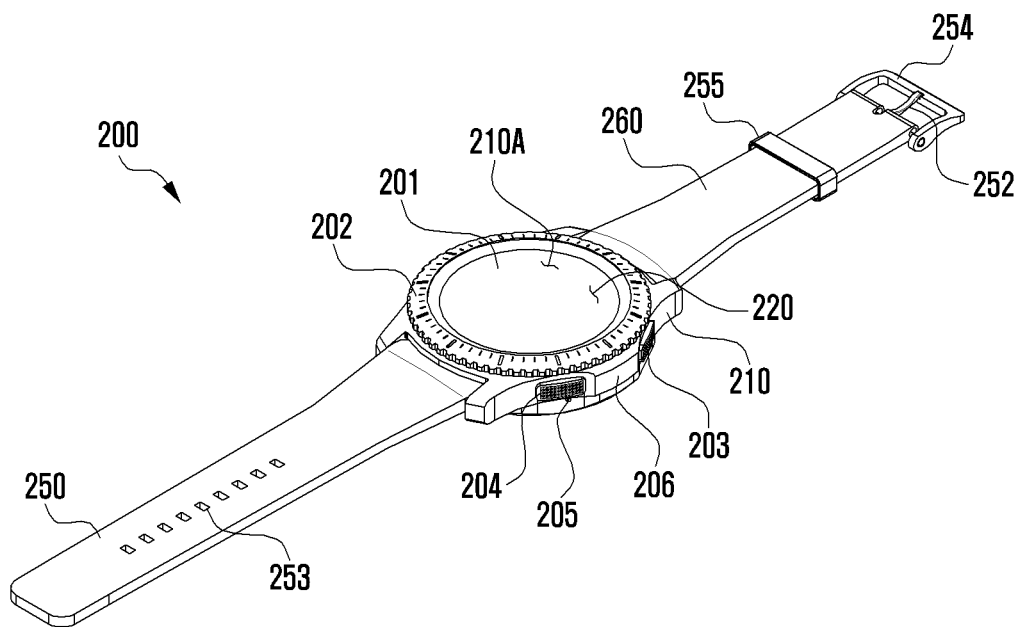
FIG. 2 is a diagram illustrating a front surface perspective view of an example wearable device according to various embodiments.
Figure 3:
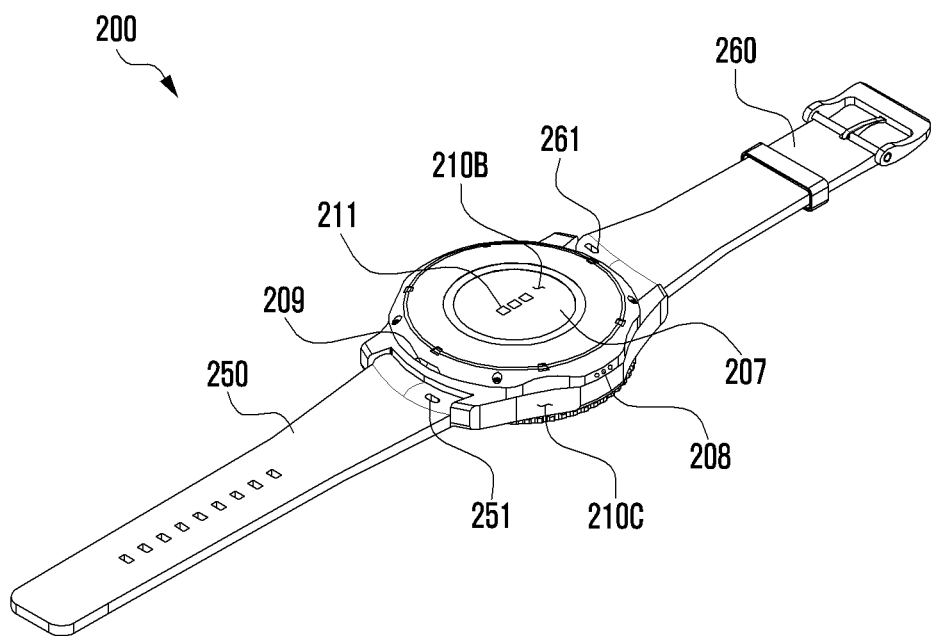
FIG. 3 is a diagram illustrating a rear surface perspective view of an example wearable device according to various embodiments.

FIG. 2 is a perspective view of a front surface of an example wearable device according to various embodiments and FIG. 3 is a perspective view of a rear surface of the example wearable device according to various embodiments.

With reference to FIGS. 2 and 3, a wearable device (e.g., the wearable device 101 of FIG. 1) according to various embodiments may include a housing 210 including a first side (or front side) 210A, a second side (or rear side) 210B, and a side surface 210C surrounding a space between the first surface 210A and the second surface 210B; and it may include binding members 250 and 260 that are connected to at least a portion of the housing 210 and configured to allow the electronic device 101 to be detachably attached to a portion (e.g., wrist, ankle) of a user's body. In an embodiment (not shown), the housing may refer to a structure that forms part of the first surface 210A, the second surface 210B, and the side surface 210C of FIG. 2.

According to an embodiment, the first surface 210A may be formed by the front plate 201 (e.g., a glass plate including various coating layers or a polymer plate) at least a portion of which is substantially transparent. The second surface 210B may be formed by a substantially opaque back plate 207. The back plate 207 may be formed by, for example, coated or tinted glass, ceramic, polymer, metal (e.g., aluminum, stainless steel (STS), or magnesium), or a combination of at least two of the foregoing. The side surface 210C is coupled to the front plate 201 and the rear plate 207 and may be formed by a side bezel structure (or "side member") 206 including a metal and/or a polymer. In various embodiments, the back plate 207 and the side bezel structure 206 are integrally formed and may include the same material (e.g., a metal material such as aluminum). The binding members 250 and 260 may be formed of various materials and shapes. A woven fabric, leather, rubber, synthetic resin, metal, ceramic, or a combination of at least two of the above materials may be used to form an integral and a plurality of unit links to be able to flow with each other.

According to various embodiments, the wearable device 200 may include at least one of a display 220 (e.g., the display module 140 of FIG. 1), audio modules 205 and 208, a sensor module 211 (e.g., the inertial sensor 150), key input devices 202, 203 and 204 (e.g., the input module 130 of FIG. 1), and a connector hole 209. In various embodiments, the wearable device 200 may omit at least one of the components (e.g., the key input devices 202, 203 and 204, the connector hole 209, or the sensor module 211) or may include other constitution elements additionally.

The display 220, for example, may be visually exposed through a substantial portion of the front plate 201. The shape of the display 220 may be a shape corresponding to the shape of the front plate 201, and it may have a circular shape, an oval shape, or a polygonal shape. The display 220 may be coupled to or disposed adjacent to a touch sensing circuit, a pressure sensor capable of measuring the intensity (pressure) of a touch, and/or a fingerprint sensor.

The audio modules 205 and 208 may include a microphone hole 205 and a speaker hole 208. In the microphone hole 205, a microphone for acquiring an external sound may be disposed therein; and, in various embodiments, a plurality of microphones may be disposed to detect the direction of the sound. The speaker hole 208 may be used as an external speaker and a receiver for calls.

The sensor module 211 may generate an electrical signal or data value corresponding to an internal operating state of the wearable device 200 or an external environmental state. The sensor module 211 may include, for example, a biometric sensor module 211 (e.g., an heart rate monitor (HRM) sensor) disposed on the second surface 210B of the housing 210. The wearable device 200 may further include a sensor module (not shown), for example, at least one of a gesture sensor, a gyro sensor, a barometric pressure sensor, a magnetic sensor, an acceleration sensor, a grip sensor, a color sensor, an IR (infrared) sensor, a biometric sensor, a temperature sensor, a humidity sensor, or an illuminance sensor.

The key input devices 202, 203, and 204 may include a wheel key 202 disposed on a first surface 210A of the housing 210 and rotatable in at least one direction, and/or side key buttons 202 and 203 disposed on a side surface 210C of the housing 210. The wheel key may have a shape corresponding to the shape of the front plate 201. In an embodiment, the electronic device 101 may not include some or all of the above-mentioned key input devices 202, 203, and 204 and the not-included key input devices 202, 203, and 204 may be implemented in the form of a soft key(s) or a touch key(s) on the display 220. The connector hole 209 may accommodate a connector (e.g., a USB connector) for transmitting and receiving power and/or data to and from an external electronic device, and it may include another connector hole (not shown) capable of accommodating a connector for transmitting and receiving audio signals to and from an external electronic device. The wearable device 200 may further include, for example, a connector cover (not shown) that covers at least a portion of the connector hole 209 and blocks or reduces the inflow of foreign substances into the connector hole.

The binding members 250 and 260 may be detachably attached to at least a partial area of the housing 210 using the locking members 251 and 261. The binding members 250 and 260 may include one or more of the fixing member 252, the fixing member fastening hole 253, the band guide member 254, and the band fixing ring 255.

The fixing member 252 may be configured to fix the housing 210 and the binding members 250 and 260 to a part of the user's body (e.g., a wrist or an ankle). The fixing member fastening hole 253 may fix the housing 210 and the binding members 250 and 260 to a part of the user's body corresponding to the fixing member 252. The band guide member 254 is configured to limit the range of movement of the fixing member 252 in a case that the fixing member 252 is fastened with the fixing member fastening hole 253, so that the binding members 250 and 260 may be made to adhere and bind to a part of the user's body. The band fixing ring 255 may limit the range of movement of the binding members 250 and 260 in a state in which the fixing member 252 and the fixing member fastening hole 253 are fastened.

Figure 4:
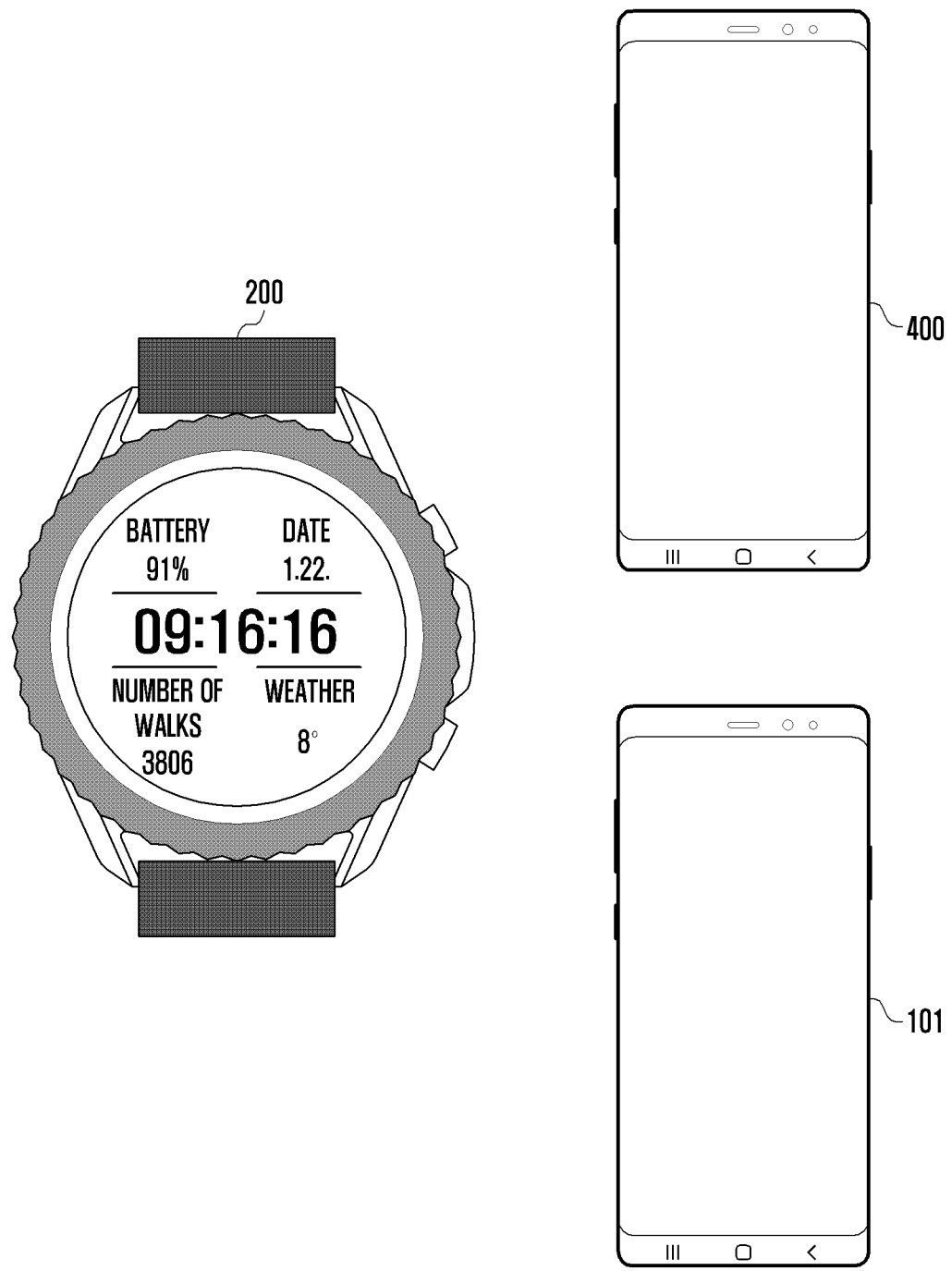
FIG. 4 is a diagram illustrating an example of backing up and restoring data stored in an example wearable device according to various embodiments.

FIG. 4 is a diagram illustrating an example of backing up and restoring data stored in an example wearable device according to various embodiments.

With reference to FIG. 4, a first electronic device 400 (e.g., the electronic device 102 of FIG. 1) according to various embodiments may exchange information by connecting with an external device (or an external output device) such as a notebook, an earphone, or a headphone using a short-range wireless communication technology (e.g., Bluetooth). Hereinafter, the external device will be described collectively as a wearable device (e.g., the wearable device 200 of FIG. 2), but the present disclosure is not limited thereto. The first electronic device 400 may be paired with the wearable device 200 using the same user account as the first electronic device 400. A user who has been using the first electronic device 400 may change (or replace) the first electronic device 400 with a second electronic device (e.g., the electronic device 101 of FIG. 1). For example, the first electronic device 400 may refer, for example, to an old electronic device, and the second electronic device 101 may refer, for example, to a new electronic device. Hereinafter, the electronic device 101 of FIG. 1 will be referred to as a "second electronic device 101" to distinguish it from the first electronic device 400.

The second electronic device 101 may receive data stored in the first electronic device 400 from the first electronic device 400. The data may include at least one of a text, an image (e.g., a photo), a video, an audio (e.g., a voice), a file (e.g., a document), data related to an application, or an application. Since the user has changed the first electronic device 400 to the second electronic device 101, the user may want to transfer data used in the first electronic device 400 to the second electronic device 101 as it is and use it. To reflect the user's needs, the second electronic device 101 may receive data from the first electronic device 400 and store it in a memory (e.g., the memory 130 of FIG. 1).

Meanwhile, the user may connect a wearable device (e.g., the wearable device 200 of FIG. 2) to the first electronic device 400 and use it. In a case of moving data stored in the first electronic device 400 to the second electronic device 101, a method for moving data related to the wearable device 200 to the second electronic device 101 may be required. To this end, the first electronic device 400 may establish a communication connection with the second electronic device 101 and receive a backup request from the user for moving data stored in the wearable device 200 to the second electronic device 101. The first electronic device 400 may request backup preparation information from the wearable device 200 in response to the backup request. The first electronic device 400 may be paired with the wearable device 200 to request the backup preparation information.

According to various embodiments, the communication connection between the first electronic device 400 and the second electronic device 101 may be wired communication or wireless communication, and it may be referred to, for example, as a first communication method. Pairing between the first electronic device 400 and the wearable device 200 may be wireless communication and may be referred to, for example, as a second communication method. The first communication method and the second communication method may correspond to different communication types, and a communication speed may be different depending on the communication type. For example, the first communication method may be USB or WiFi, and the second communication method may be Bluetooth. The first communication method may have a faster communication speed than the second communication method. The first communication method or the second communication method is only an example for facilitating understanding of the disclosure, but the disclosure is not limited by these examples.

The wearable device 200 may generate the backup preparation information in response to the request for the backup preparation information. The backup preparation information may include information on data to be backed up and a MAC address of the wearable device 200. For example, the information about the data to be backed up may include a type of data to be backed up (e.g., a text, an image, a video, application-related data, or an application) or the number of backups corresponding to the data type. The wearable device 200 may transmit the generated backup preparation information to the first electronic device 400. The first electronic device 400 may transmit the backup preparation information received from the wearable device 200 to the second electronic device 101. The second electronic device 101 may receive the backup preparation information from the first electronic device 400 and establish a communication connection (e.g., establishing a communication channel) with the wearable device 200 based on the backup preparation information.

Since the backup preparation information includes the MAC address of the wearable device 200, the second electronic device 101 may establish a communication connection with the wearable device 200 based on the MAC address of the wearable device 200. The communication connection between the second electronic device 101 and the wearable device 200 may be a wireless communication connection and may be a third communication method. The third communication method may be the same as or different from the first communication method and/or the second communication method. For example, the third communication method may be WiFi. The second electronic device 101 may request a backup of data stored in the wearable device 200. The backup request may be transmitted directly to the wearable device 200 or may be transmitted to the wearable device 200 through the first electronic device 400.

According to various embodiments, in accordance with the implementation of the electronic device, the second electronic device 101 and the wearable device 200 may be connected communicatively after a backup request. The drawings are provided to help the understanding of the disclosure, but the disclosure is not limited by the description.

According to various embodiments, the user may want to transfer not only data stored in the wearable device 200, but also data stored in the first electronic device 400 to the second electronic device 101. In a case that only data stored in the wearable device 200 is backed up, the backup request may be transmitted directly to the wearable device 200. Alternatively, in a case that only data stored in the wearable device 200 is backed up in accordance with an implementation, the backup request may be transmitted to the wearable device 200 through the first electronic device 400. Alternatively, in a case of backing up data stored in the wearable device 200 and data stored in the first electronic device 400, the backup request may be transmitted to the wearable device 200 through the first electronic device 400. The wearable device 200 may generate backup data in response to the backup request. The backup data may be different from the backup preparation information, and it may refer, for example, to data itself. The wearable device 200 may transmit directly the generated backup data to the second electronic device 101 or may transmit it to the second electronic device 101 through the first electronic device 400. The wearable device 200 may transmit the generated backup data to the first electronic device 400, and the first electronic device 400 may transmit the backup data to the second electronic device 101.

The second electronic device 101 may receive the backup data from the wearable device 200 and store it in the memory 130. Alternatively, the second electronic device 101 may receive the backup data from the first electronic device 400. The backup data may be stored in a designated area of the memory 130. The designated area may be an area accessible to a configured application that controls backup and restoration of data stored in the first electronic device 400 or the wearable device 200. The wearable device 200 may provide notification that the backup data transmission is complete. The backup completion may be transmitted directly to the second electronic device 101 or may be transmitted to the second electronic device 101 through the first electronic device 400. According to various embodiments, in a case that only data stored in the wearable device 200 is backed up, the completion of the backup may be transmitted directly to the second electronic device 101. Alternatively, in a case of backing up data stored in the wearable device 200 and data stored in the first electronic device 400, the completion of the backup may be transmitted to the second electronic device 101 through the first electronic device 400.

In a case that the backup is complete, the second electronic device 100 may request a device reset (e.g., transmitting a device reset signal) to the wearable device 200. Since the wearable device 200 is being used in connection with the first electronic device 400, it may be necessary to reset the wearable device 200 in order to pair and use it with the second electronic device 101. The device reset request may be transmitted through a fourth communication method. The fourth communication method may, for example, be different from the first communication method, the second communication method, and/or the third communication method, and a communication speed of the fourth communication method may be slower than that of the first communication method, the second communication method, and/or the third communication method. For example, the fourth communication method may be Bluetooth low energy (BLE). Also, in a case that the backup is complete, the second electronic device 101 may release the communication connection with the first electronic device 400.

The wearable device 200 may receive a device reset signal from the second electronic device 101 and reset the wearable device 200 based on the device reset signal. According to various embodiments, in a case that the device reset signal is received from the second electronic device 101, the wearable device 200 may provide a user interface for inquiring whether the device is to be reset. The user interface may include at least one of a text, an image, an audio, and/or a video. The user may not be aware that a reset is required in order to pair and use the wearable device 200 with the second electronic device 101. The user interface may be a guide to backing up the data stored in the wearable device 200 in the second electronic device 101 as a reset is required for pairing with the second electronic device 101, and data stored in the wearable device 200 is deleted upon reset. For example, in a case that the user selects a reset button included in the user interface, the wearable device 200 may be reset. In a case that the user does not select the reset button, the wearable device 200 may not be reset.

In the case that the wearable device 200 is reset in accordance with a user's selection, the wearable device 200 may perform a pairing procedure. The pairing procedure may include a discovery procedure and a mutual key authentication procedure. The wearable device 200 may broadcast a signal for pairing, and the second electronic device 101 may receive the broadcast signal to pair with the wearable device 200. Pairing between the wearable device 200 and the second electronic device 101 may be through a second communication method. Upon receiving the broadcast signal, the second electronic device 101 may display information on the wearable device 200 that broadcast the signal on a display (e.g., the display module 160 of FIG. 1).

The second electronic device 101 may receive from the user a user input for selecting (or touching) information on the wearable device 200. The second electronic device 101 may request pairing with the wearable device 200 based on the received user input. The second electronic device 101 may install an application for pairing with the wearable device 200. For example, the second electronic device 101 may provide a user interface for inputting a pin number (or pin code) of the wearable device 200. For example, the second electronic device 101 may input the pin number included in the backup data to the user interface in a case that the MAC address of the wearable device 200 requesting the pairing is the same as the MAC address of backup data stored in the memory 130, and the pin number is included in the backup data. Alternatively, in a case that the MAC address of the wearable device 200 requesting the pairing is not the same as the MAC address of the backup data stored in the memory 130 or the pin number is not included in the backup data, the second electronic device 101 may request the user to input a pin number.

In a case that the second electronic device 101 is paired with the wearable device 200, the second electronic device 101 may search for whether backup data related to the wearable device 200 is stored in the memory 130. In a case that the backup data of the wearable device 200 is stored, the second electronic device 101 may perform a data restoration process with the wearable device 200. Since the backup data includes user-related information (e.g., photo), there may be a risk of leakage to users other than the user. In a case of storing the backup data, the second electronic device 101 may also store the MAC address of the wearable device 200 to be backed up. The second electronic device 101 may determine whether the MAC address of the paired wearable device 200 corresponds to (e.g., matches) the MAC address included in the backup data. In a case that the MAC address of the paired wearable device 200 matches the MAC address included in the backup data, the second electronic device 101 may perform the data restoration process. In a case that the MAC address of the paired wearable device 200 does not match the MAC address included in the backup data, the second electronic device 101 may skip (e.g., do not perform) the data restoration process.

The data restoration process may include an operation of restoring data of the wearable device 200. The second electronic device 101 may transmit the backup data stored in the memory 130 to the wearable device 200. In a case of pairing with the wearable device 200, the second electronic device 101 may be connected to the wearable device 200 by a second communication method, and in a case of transmitting the backup data, it may be connected to the wearable device 200 by a third communication method. The wearable device 200 may receive the backup data from the second electronic device 101 and restore data of the wearable device 200 based on the backup data. In a case that data restoration is complete, the wearable device 200 may output a data restoration completion notification (or a notification sound). In a case that data restoration is complete, the wearable device 200 may notify the second electronic device 101 of data restoration completion. In a case that data restoration of the wearable device 200 is complete, the second electronic device 101 may transmit the backup data to a server (e.g., the server 108 of FIG. 1) in accordance with a user's selection.

A wearable device (e.g., the wearable device 200 of FIG. 2) according to various embodiments of the disclosure may include a communication module (e.g., the communication module 190 of FIG. 1) (e.g., including communication circuitry), a memory (e.g., the memory 130 of FIG. 1), and a processor (e.g., the processor 120 of FIG. 1) (e.g., including processing circuitry) operatively connected to at least one of the communication module and the memory, wherein the processor is configured to transmit information related to the wearable device to a first electronic device through the communication module in accordance with a request from the first electronic device (e.g., the electronic device 400 of FIG. 4); establish a communication connection with a second electronic device (e.g., the electronic device 101 of FIG. 1) based on the information; receive a request for backing up the data stored in the wearable device from the first electronic device; generate backup data based on the backup request; transmit the generated backup data to the second electronic device; and reset the wearable device based on a device reset request in a case of receiving the device reset request from the second electronic device.

The processor may be configured to transmit the information related to the wearable device to the first electronic device through a second communication method, transmit the generated backup data to the second electronic device through a third communication method, wherein the third communication method has a faster communication speed than the second communication method.

The processor may be configured to receive a device reset request from the second electronic device through a fourth communication method, wherein the fourth communication method is different from the second communication method or the third communication method.

The processor may control the backup data to be transmitted to the second electronic device by transmitting directly the generated backup data to the second electronic device or by transmitting the generated backup data to the first electronic device.

The processor may be configured to provide a user interface inquiring whether the wearable device is to be reset in a case of receiving the device reset request, and reset the wearable device in a case that a user's reset request is input through the user interface.

The processor may be configured to pair with the second electronic device after resetting the wearable device, receive the backup data from the second electronic device, and restore data of the wearable device based on the received backup data.

The processor may be configured to pair with the second electronic device in a second communication method, receive the backup data in a third communication method, wherein the third communication method has a faster communication speed than the second communication method.

An electronic device (e.g., the electronic device 101 of FIG. 1) according to various embodiments of the disclosure may include a communication module (e.g., the communication module 190 of FIG. 1) (e.g., including communication circuitry), a memory (e.g., the memory 130 of FIG. 1), and a processor (e.g., the processor 120 of FIG. 1) (e.g., including processing circuitry) operatively connected to at least one of the communication module or the memory, wherein the processor may be controlled to establish a communication connection with an external electronic device (e.g., the first electronic device 400 of FIG. 4) through the communication module; receive information related to a wearable device (e.g., the wearable device 200 of FIG. 2) from the external electronic device; establish a communication connection with the wearable device based on the information; receive backup data based on a backup request for data stored in the wearable device; store the received backup data in the memory; request a device reset to the wearable device; and reset the wearable device.

The processor may be configured to establish a communication connection with the wearable device based on a MAC address of the wearable device included in the information related to the wearable device.

The processor may be configured to transmit the backup request to the wearable device through the external electronic device in a case that a backup of data stored in the wearable device and data stored in the external electronic device is requested; and transmit directly the backup request to the wearable device in a case that only data stored in the wearable device is backed up.

The processor may be configured to establish a communication connection with the external electronic device in a first communication method; receive information related to the wearable device in a second communication method; establish a communication connection with the wearable device in a third communication method; wherein the first communication method has a faster communication speed than the second communication method, and the third communication method has the same communication speed as or a different communication speed from the first communication method or the second communication method.

The processor may store the received backup data in a designated area of the memory, and the designated area may be an area accessible to a configured application that controls backup and restoration of data stored in the external electronic device or the wearable device.

The processor may be configured to transmit a device reset signal to the wearable device in a fourth communication method, wherein the fourth communication method has a slower communication speed than the first communication method, the second communication method and the third communication method.

The processor may, after the device reset is requested to the wearable device, be configured to pair with the wearable device that has requested to pair; determine whether the MAC address of the paired wearable device and the MAC address included in the backup data stored in the memory correspond to each other; and determine whether to perform a data restoration process based on the result of the determination.

The processor may be configured to transmit the backup data stored in the memory to the paired wearable device in a case that the MAC address of the paired wearable device and the MAC address included in the backup data stored in the memory correspond to each other, and skip the data restoration process in a case that the MAC address of the paired wearable device and the MAC address included in the backup data stored in the memory do not correspond to each other.

Figure 5:
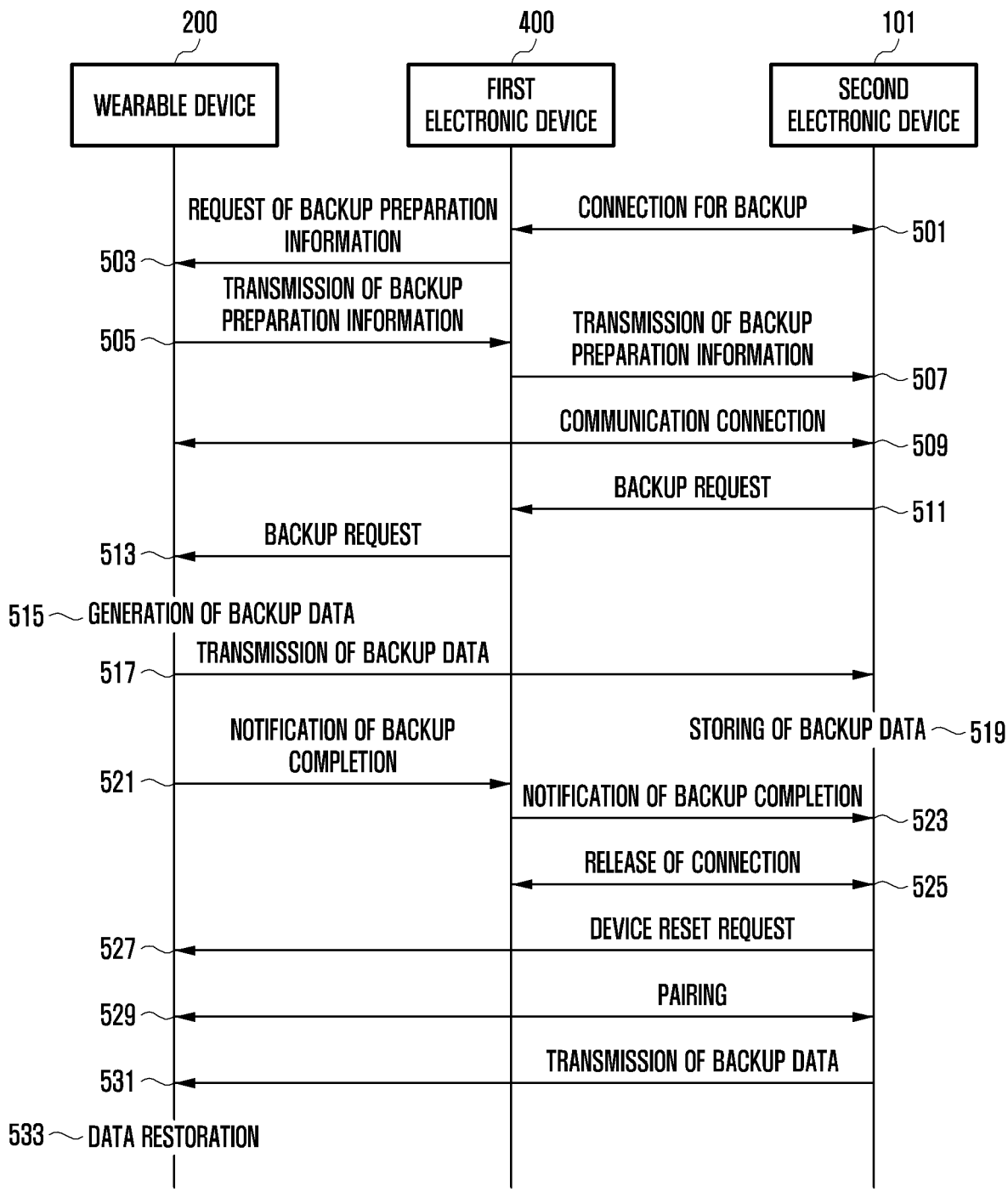
FIG. 5 is a flowchart illustrating an example operation method between electronic devices and a wearable device according to various embodiments.

FIG. 5 is a flowchart illustrating an example operation method between example electronic devices and an example wearable device according to various embodiments.

With reference to FIG. 5, in operation 501, a first electronic device (e.g., the first electronic device 400 of FIG. 4) according to various embodiments may establish a communication connection with a second electronic device (e.g., the second electronic device 101 of FIG. 4). The communication connection between the first electronic device 400 and the second electronic device 101 may be wired communication or wireless communication, and it may, for example, be a first communication method. For example, the first communication method may be USB or WiFi. In a case that data stored in the first electronic device 400 is moved to the second electronic device 101, data stored in the wearable device 200 may be moved to the second electronic device 101. To this end, the user may execute each configured application (e.g., smart switch) in the first electronic device 400 and the second electronic device 101. For example, in a case that a configured application is executed in the first electronic device 400 and a configured application is executed in the second electronic device 101, the first electronic device 400 and the second electronic device 101 may be connected communicatively by the configured application.

In operation 503, the first electronic device 400 may request backup preparation information from a wearable device (e.g., the wearable device 200 of FIG. 2). The user may request a backup for moving data stored in the wearable device 200 to the second electronic device 101. The first electronic device 400 may request the backup preparation information to the wearable device 200 in accordance with the user's backup request. The connection between the first electronic device 400 and the wearable device 200 may be wireless communication and it may, for example, be a second communication method. The first communication method may have a faster communication speed than the second communication method.

In operation 505, the wearable device 200 may receive the request for backup preparation information and transmit the backup preparation information to the first electronic device 400. The backup preparation information may include information on data to be backed up and a MAC address of the wearable device 200. For example, the information on the data to be backed up may include the type of data to be backed up or the number of backups corresponding to the data type. The wearable device 200 may transmit the generated backup preparation information to the first electronic device 400 through the second communication method.

In operation 507, the first electronic device 400 may transmit the backup preparation information received from the wearable device 200 to the second electronic device 101. In a case that the second electronic device 101 requests to back up data stored in the first electronic device 400, the first electronic device 400 may transmit backup preparation information of the wearable device 200 together with backup preparation information of the first electronic device 400 to the second electronic device 101.

In operation 509, the second electronic device 101 may receive the backup preparation information from the first electronic device 400 and establish a communication connection with the wearable device 200 based on the backup preparation information (e.g., establishing a communication channel). The second electronic device 101 may store the backup preparation information in a memory (e.g., the memory 130 of FIG. 1). Since the backup preparation information includes the MAC address of the wearable device 200, the second electronic device 101 may establish a communication connection with the wearable device 200 based on the MAC address of the wearable device 200. The communication connection between the second electronic device 101 and the wearable device 200 may be wireless communication and it may, for example, be a third communication method. The third communication method may be the same as or different from the first communication method or the second communication method. For example, the third communication method may be WiFi.

According to various embodiments, although FIG. 5 illustrates that the second electronic device 101 and the wearable device 200 are connected communicatively before the backup request, the second electronic device 101 and the wearable device 200 may also be connected communicatively after the backup request in accordance with an implementation. The drawings are provided to facilitate the understanding of the disclosure, but the disclosure is not limited by the description.

In operation 511, the second electronic device 101 may request a backup of data stored in the wearable device 200. The second electronic device 101 may request the backup to the first electronic device 400 so that the backup request is transmitted to the wearable device 200, or it may directly request the backup to the wearable device 200. For example, in a case that the second electronic device 101 requests a backup of data stored in the wearable device 200 and data stored in the first electronic device 400, the backup request may be transmitted to the wearable device 200 through the first electronic device 400. Alternatively, in a case that only data stored in the wearable device 200 is backed up, the backup request may be transmitted directly to the wearable device 200. Alternatively, in a case that only data stored in the wearable device 200 is backed up in accordance with an implementation, the backup request may be transmitted to the wearable device 200 through the first electronic device 400.

In operation 513, the first electronic device 400 may request a backup to the wearable device 200 in response to the backup request.

In operation 515, the wearable device 200 may generate backup data according to the backup request. The backup data may be different from the backup preparation information, and it may refer, for example, to the data itself.

In operation 517, the wearable device 200 may transmit the generated backup data to the second electronic device 101. The wearable device 200 may transmit directly the generated backup data to the second electronic device 101 or transmit the generated backup data to the second electronic device 101 through the first electronic device 400. The wearable device 200 may transmit the generated backup data to the first electronic device 400, and the first electronic device 400 may transmit the backup data to the second electronic device 101. The backup data may be transmitted in accordance with a third communication method (e.g., WiFi).

In operation 519, the second electronic device 101 may store the backup data in the memory 130. The backup data may be stored in a designated area of the memory 130. The designated area may be an area accessible to a configured application that controls backup and restoration of data stored in the first electronic device 400 or the wearable device 200.

In operation 521, the wearable device 200 may provide notification that the backup data transmission is complete. Although the figure shows the backup data transmission and the backup completion notification as separate operations, the backup completion notification may be transmitted in a manner where the backup completion notification is included in the data packet for transmitting the backup data. The division of these operations is only for facilitating the understanding of the disclosure, and the description is not intended to limit the disclosure. The backup completion may be transmitted directly to the second electronic device 101, or it may be transmitted to the second electronic device 101 through the first electronic device 400.

In operation 523, the first electronic device 400 may transmit the backup completion notification of the wearable device 200 to the second electronic device 101. According to various embodiments, in a case that only data stored in the wearable device 200 is backed up, the completion of the backup may be transmitted directly to the second electronic device 101. Alternatively, in a case of backing up data stored in the wearable device 200 and data stored in the first electronic device 400, the completion of the backup may be transmitted to the second electronic device 101 through the first electronic device 400.

In operation 525, the second electronic device 101 may release a communication connection with the first electronic device 400. In a case that the data backup of the wearable device 200 is complete, the second electronic device 101 may release the communication connection with the first electronic device 400. For example, the application executed in the first electronic device 400 may be terminated. In a case that the application is terminated, the second electronic device 101 may release the communication connection with the first electronic device 400.

In operation 527, the second electronic device 101 may request a device reset to the wearable device 200. Since the wearable device 200 is being used in connection with the first electronic device 400, it may be necessary to reset the wearable device 200 in order to pair and use it with the second electronic device 101. The device reset request may be transmitted through a fourth communication method. The fourth communication method may be different from the first communication method, the second communication method, and the third communication method, and a communication speed of the fourth communication method may be slower than the first communication method, the second communication method, and the third communication method. For example, the fourth communication method may be Bluetooth low energy. The wearable device 200 may receive a device reset signal from the second electronic device 101 and reset the wearable device 200 based on the device reset signal.

According to various embodiments, in a case that the device reset signal is received from the second electronic device 101, the wearable device 200 may provide a user interface for inquiring whether the device is to be reset. The user interface may be include at least one of a text, an image, an audio, or a video. The user may not be aware that a reset is required in order to pair and use the wearable device 200 with the second electronic device 101. The user interface may be a guide to backing up the data stored in the wearable device 200 in the second electronic device 101 as a reset is required for pairing with the second electronic device 101, and data stored in the wearable device 200 is deleted upon reset. For example, in a case that the user selects a reset button displayed on the user interface, the wearable device 200 may be reset. In a case that the user does not select the reset button, the wearable device 200 may not be reset.

In operation 529, the second electronic device 101 may be paired with the wearable device 200. In a case that the wearable device 200 is reset in accordance with a user's selection, the wearable device 200 may perform a pairing procedure. The second electronic device 101 may install an application for pairing with the wearable device 200. For example, the wearable device 200 may broadcast a signal for pairing, and the second electronic device 101 may receive the broadcast signal to pair with the wearable device 200. Upon receiving the broadcast signal, the second electronic device 101 may display information on the wearable device 200 that broadcast the signal on a display (e.g., the display module 160 of FIG. 1).

In operation 531, the second electronic device 101 may transmit backup data to the wearable device 200. In a case that the second electronic device 101 is paired with the wearable device 200, it may search whether backup data related to the wearable device 200 is stored in the memory 130. In a case that the backup data of the wearable device 200 is stored, the second electronic device 101 may perform a data restoration process with the wearable device 200. The second electronic device 101 may transmit the backup data stored in the memory 130 to the wearable device 200. In a case of pairing with the wearable device 200, the second electronic device 101 may be connected to the wearable device 200 by a second communication method, and in the case of transmitting the backup data, it may be connected to the wearable device 200 by a third communication method.

According to various embodiments, since the backup data includes user-related information (e.g., photo), there may be a risk of leakage to users other than the user. In a case of storing the backup data, the second electronic device 101 may also store the MAC address of the wearable device 200 to be backed up. The second electronic device 101 may determine whether the MAC address of the paired wearable device 200 corresponds to (e.g., matches) the MAC address included in the backup data. In a case that the MAC address of the paired wearable device 200 matches the MAC address included in the backup data, the second electronic device 101 may perform the data restoration process. In a case that the MAC address of the paired wearable device 200 does not match the MAC address included in the backup data, the second electronic device 101 may skip (e.g., do not perform) the data restoration process.

In operation 533, the wearable device 200 may restore data of the wearable device 200 based on the backup data. In a case that data restoration is complete, the wearable device 200 may output a data restoration completion notification (or a notification sound). In a case that data restoration is complete, the wearable device 200 may notify the second electronic device 101 of data restoration completion.

Figure 6:
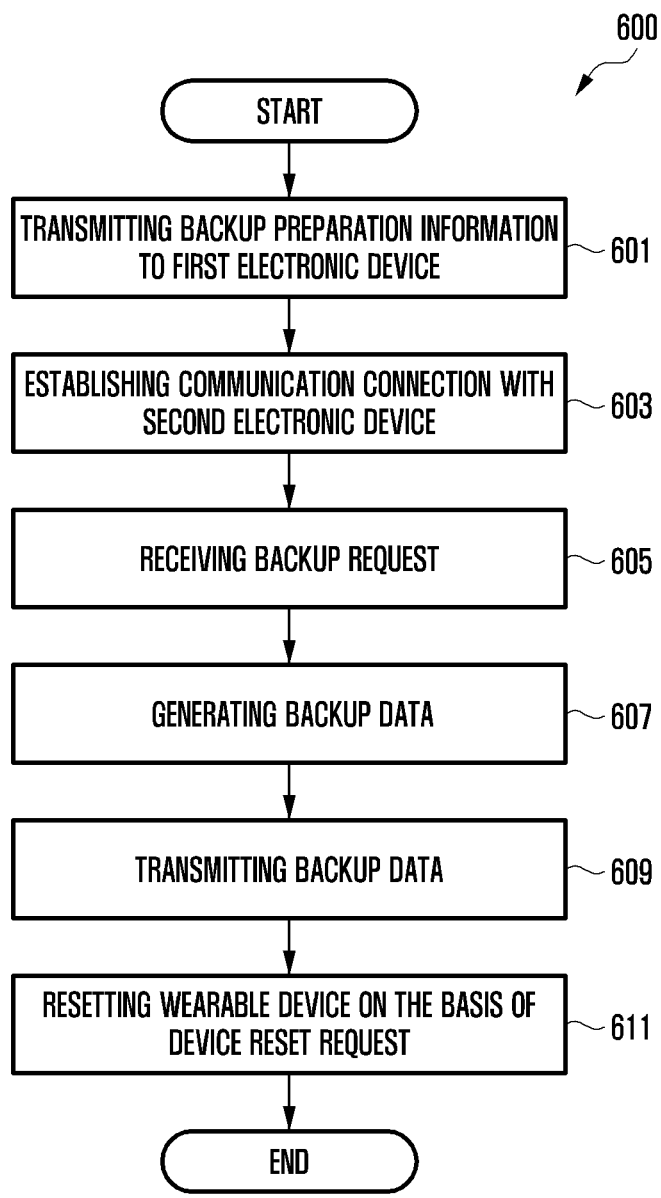
FIG. 6 is a flowchart illustrating an example data backup method of an example wearable device according to various embodiments.

FIG. 6 is a flowchart 600 illustrating an example data backup method of an example wearable device according to various embodiments.

With reference to FIG. 6, in operation 601, the processor (e.g., the processor 120 of FIG. 1) of the wearable device (e.g., the wearable device 200 of FIG. 2) according to various embodiments may transmit the backup preparation information to the first electronic device (e.g., the first electronic device 400 of FIG. 4) through a communication module (e.g., the communication module 190 of FIG. 1). The backup preparation information may be generated in accordance with a backup request of the first electronic device 400. The backup preparation information may include information on data to be backed up and a MAC address of the wearable device 200. For example, the information on the data to be backed up may include the type of data to be backed up or the number of backups corresponding to the data type. The processor 120 may establish a communication connection with the first electronic device 400 in a second communication method before transmitting the backup preparation information.

In operation 603, the processor 120 may establish a communication connection with a second electronic device (e.g., the electronic device 101 of FIG. 1). The first electronic device 400 may refer, for example, to an old electronic device, and the second electronic device 101 may refer, for example, to a new electronic device. Hereinafter, the electronic device 101 of FIG. 1 will be referred to as a "second electronic device 101" to distinguish it from the first electronic device 400. The backup preparation information may be transmitted to the second electronic device 101 through the first electronic device 400. The second electronic device 101 may establish a communication connection with the wearable device 200 based on identification information (e.g., MAC address) of the wearable device 200 included in the backup preparation information. The processor 120 may establish a communication connection with the second electronic device 101 in a third communication method. The third communication method may be the same as or different from the second communication method.

According to various embodiments, although FIG. 6 illustrates that the processor 120 has established a communication connection with the second electronic device 101 before the backup request, it may also establish a communication connection with the second electronic device 101 after the backup request in accordance with an implementation. The drawings are provided to facilitate the understanding of the disclosure, but the disclosure is not limited by the description.

In operation 605, the processor 120 may receive a backup request. The backup request may be received from the first electronic device 400. The backup request may be for backing up data stored in the wearable device 200. The processor 120 may receive the backup request from the first electronic device 400.

In operation 607, the processor 120 may generate backup data in response to the backup request. The backup data may be different from the backup preparation information, and may, for example, refer to the data itself. For example, the backup data may include at least one of an application stored in the wearable device 200, application-related data (e.g., calendar data), an image (e.g., photo), a text, a video, or an audio.

In operation 609, the processor 120 may transmit the generated backup data. The processor 120 may transmit directly the generated backup data to the second electronic device 101 through a third communication method (e.g., WiFi), or it may transmit to the second electronic device 101 through the first electronic device 400. The processor 120 may transmit the generated backup data to the first electronic device 400, and the first electronic device 400 may transmit the backup data to the second electronic device 101.

In operation 611, the processor 120 may reset the wearable device 200 based on the device reset request. Since the wearable device 200 is being used in connection with the first electronic device 400, it may be necessary to reset the wearable device 200 in order to pair and use it with the second electronic device 101. The device reset request may be transmitted through a fourth communication method. The fourth communication method may be different from the first communication method, the second communication method, and the third communication method, and a communication speed of the fourth communication method may be slower than communication speeds of the first communication method, the second communication method, and the third communication method. For example, the fourth communication method may be Bluetooth low energy. The processor 120 may receive a device reset signal from the second electronic device 101 and reset the wearable device 200 based on the device reset signal.

Figure 7:
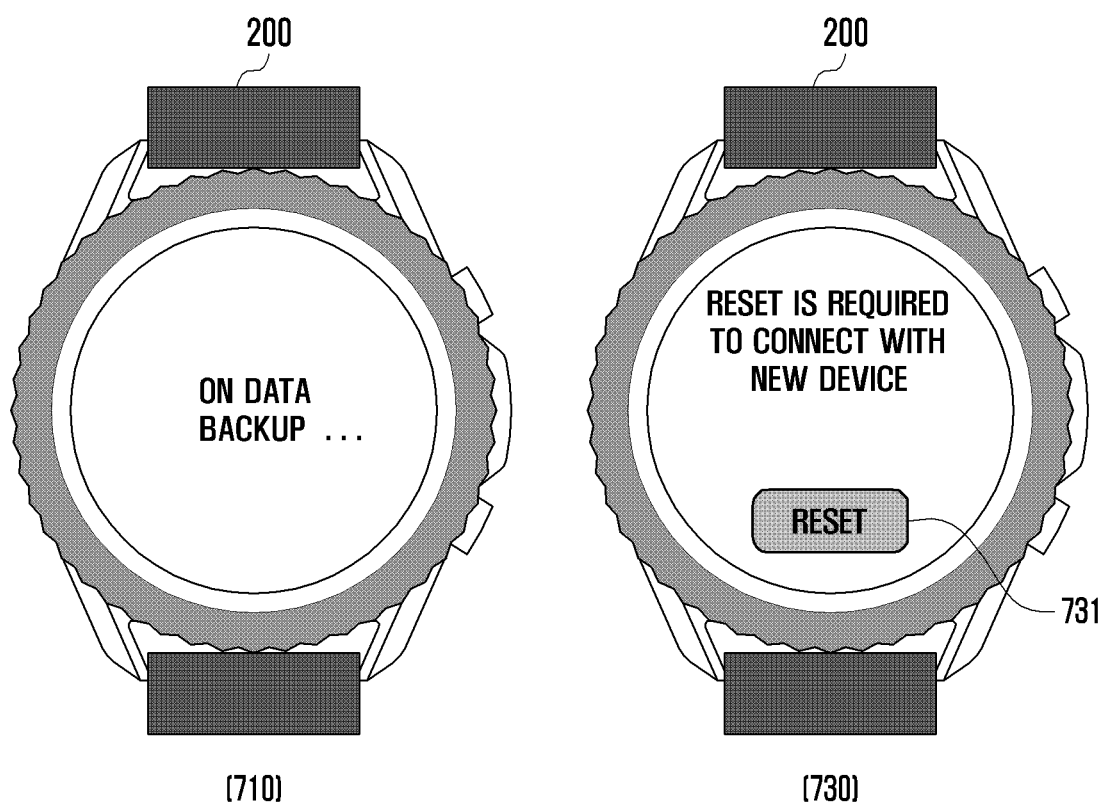
FIG. 7 is a diagram illustrating an example user interface related to data backup of an example wearable device according to various embodiments.

FIG. 7 is a diagram illustrating an example user interface related to data backup of an example wearable device according to various embodiments.

With reference to FIG. 7, the processor (e.g., the processor 120 of FIG. 1) of the wearable device (e.g., the wearable device 200 of FIG. 2) according to various embodiments may provide a first user interface 710 in accordance with a data backup request. The processor 120 may receive a backup request from the first electronic device (e.g., the first electronic device 400 of FIG. 4) through a communication module (e.g., the communication module 190 of FIG. 1). The processor 120 may display the first user interface 710 through a display (e.g., the display module 160 of FIG. 1) while generating or transmitting backup data according to the backup request. The first user interface 710 may provide information that the wearable device 200 is backing up data.

In a case of receiving a device reset signal from the second electronic device (e.g., the electronic device 101 of FIG. 1), the processor 120 may provide the second user interface 730. Since the wearable device 200 is being used in connection with the first electronic device 400, it may be necessary to reset the wearable device 200 in order to pair and use it with the second electronic device 101. The second user interface 730 may provide guidance that reset is necessary to connect with the second electronic device 101 (e.g., a new device) and that data stored in the wearable device 200 is stored in the second electronic device 101. In a case that the user selects the reset button 731 on the second user interface 730, the processor 120 may reset the wearable device 200. If the user does not select the reset button 731 on the second user interface 730, the processor 120 may not reset the wearable device 200.

According to various embodiments, the first user interface 710 and the second user interface 730 may be execution screens of a configured application that controls data backup and restoration. The first user interface 710 and the second user interface 730 may include at least one of a text, an image, an audio, or a video.

Figure 8:
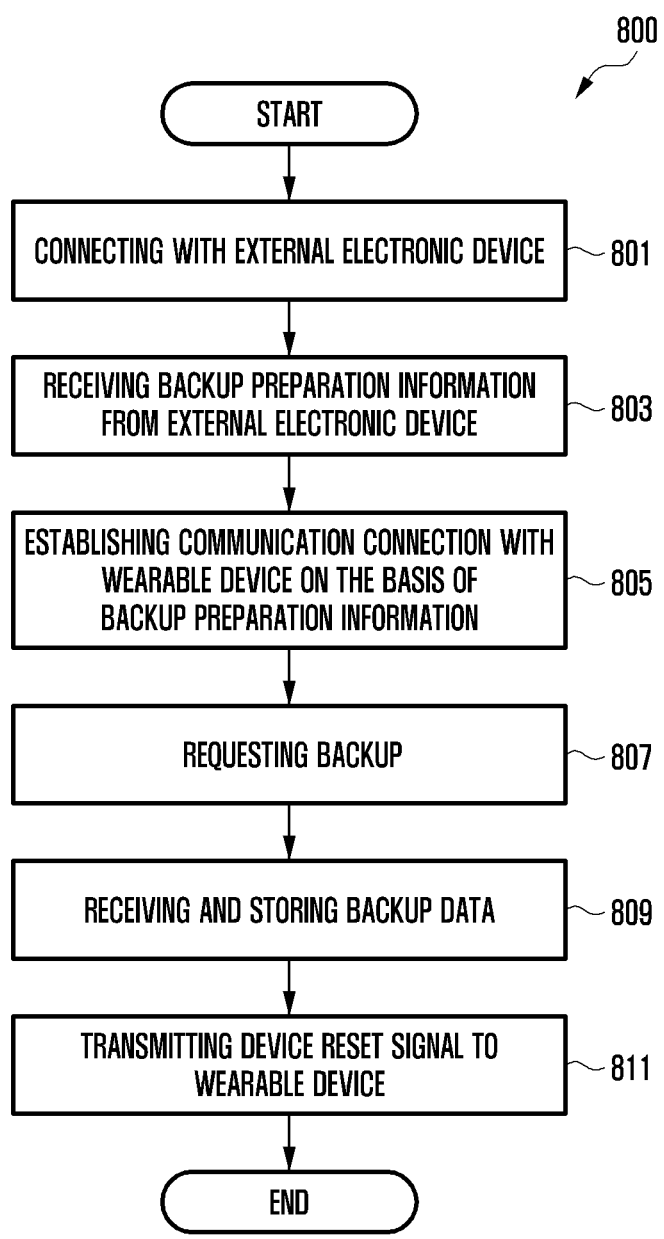
FIG. 8 is a flowchart illustrating an example data backup method of an example electronic device according to various embodiments.

FIG. 8 is a flowchart 800 illustrating an example data backup method of an example electronic device according to various embodiments.

With reference to FIG. 8, in operation 801, the processor (e.g., the processor 120 of FIG. 1) of the electronic device (e.g., the electronic device 101 of FIG. 1) according to various embodiments may be connected (e.g., connected communicatively) with an external electronic device (e.g., the first electronic device 400 of FIG. 4). Hereinafter, the electronic device 101 of FIG. 1 will be referred to as a "second electronic device 101" to distinguish it from the first electronic device 400. For example, a user who has been using the first electronic device 400 may change (or replace) the first electronic device 400 with the second electronic device 101. Since the user has changed the first electronic device 400 to the second electronic device 101, the user may want to transfer data used in the first electronic device 400 to the second electronic device 101 as it is and use it. To reflect the user's needs, the processor 120 may connect to the first electronic device 400 through a communication module (e.g., the communication module 190 of FIG. 1) in the first communication method.

According to various embodiments, the processor 120 may connect to the first electronic device 400 through wired communication or wireless communication, and the first communication method may, for example, be USB or WiFi. To this end, the user may execute each configured application in the first electronic device 400 and the second electronic device 101. For example, in a case that a configured application is executed in the first electronic device 400 and a configured application is executed in the second electronic device 101, the first electronic device 400 and the second electronic device 101 may be connected communicatively by the configured application.

In operation 803, the processor 120 may receive backup preparation information from the first electronic device 400 (e.g., an external electronic device). The user may request a backup for moving data stored in the wearable device (e.g., the wearable device 200 of FIG. 2) to the second electronic device 101. The user's backup request may be transmitted to the wearable device 200 through the first electronic device 400. The backup preparation information may include information on data to be backed up and a MAC address of the wearable device 200. For example, the information on the data to be backed up may include the type of data to be backed up or the number of backups corresponding to the data type. The processor 120 may store the backup preparation information in a memory (e.g., the memory 130 of FIG. 1).

In operation 805, the processor 120 may establish a communication connection with the wearable device 200 based on the backup preparation information. Since the backup preparation information includes the MAC address of the wearable device 200, the processor 120 may establish a communication connection with the wearable device 200 based on the MAC address of the wearable device 200. The processor 120 may establish a communication connection with the wearable device 200 in a third communication method. The third communication method may be the same as or different from the first communication method or the second communication method. For example, the third communication method may be WiFi.

According to various embodiments, although FIG. 8 illustrates that the processor 120 establishes a communication connection with the wearable device 200 before the backup request, it may also establish a communication connection with the wearable device 200 after the backup request in accordance with an implementation. The drawings are provided to facilitate the understanding of the disclosure, but the disclosure is not limited by the description.

In operation 807, the processor 120 may request a backup of data stored in the wearable device 200. The backup request may be transmitted directly to the wearable device 200 or may be transmitted to the wearable device 200 through the first electronic device 400. For example, in a case that the second electronic device 101 requests a backup of data stored in the wearable device 200 and data stored in the first electronic device 400, the backup request may be transmitted to the wearable device 200 through the first electronic device 400. Alternatively, in a case that only data stored in the wearable device 200 is backed up, the backup request may be transmitted directly to the wearable device 200. Alternatively, in a case that only data stored in the wearable device 200 is backed up in accordance with an implementation, the backup request may be transmitted to the wearable device 200 through the first electronic device 400.

In operation 809, the processor 120 may receive the backup data and store it in the memory 120. The backup data is different from the backup preparation information, and may, for example, refer to the data itself. The processor 120 may receive the backup data directly from the wearable device 200 or through the first electronic device 400. The backup data may be transmitted according to the third communication method. The backup data may be stored in a designated area of the memory 130. The designated area may be an area accessible to a configured application that controls backup and restoration of data stored in the first electronic device 400 or the wearable device 200.

In operation 811, the processor 120 may transmit a device reset signal to the wearable device 200. In a case of receiving notice that the transmission of the backup data is complete, the processor 120 may transmit the device reset signal. According to various embodiments, in a case that only data stored in the wearable device 200 is backed up, the processor 120 may directly receive notice of the completion of transmission of the backup data from the wearable device 200. Alternatively, in a case of backing up data stored in the wearable device 200 and data stored in the first electronic device 400, the processor 120 may receive notice of the completion of transmission of the backup data through the first electronic device 400. In a case that receiving notice that the transmission of the backup data is complete, the processor 120 may release the communication connection with the first electronic device 400. For example, the application executed in the first electronic device 400 may be terminated. In a case that the application is terminated, the processor 120 may release the communication connection with the first electronic device 400.

Since the wearable device 200 is being used in connection with the first electronic device 400, it may be necessary to reset the wearable device 200 in order to pair and use it with the second electronic device 101. The device reset signal may be transmitted through a fourth communication method. The fourth communication method may be different from the first communication method, the second communication method, and the third communication method, and a communication speed of the fourth communication method may be slower than communication speeds of the first communication method, the second communication method, and the third communication method. For example, the fourth communication method may be Bluetooth low energy. The wearable device 200 may receive a device reset signal from the second electronic device 101 and reset the wearable device 200 based on the device reset signal.

Figure 9:
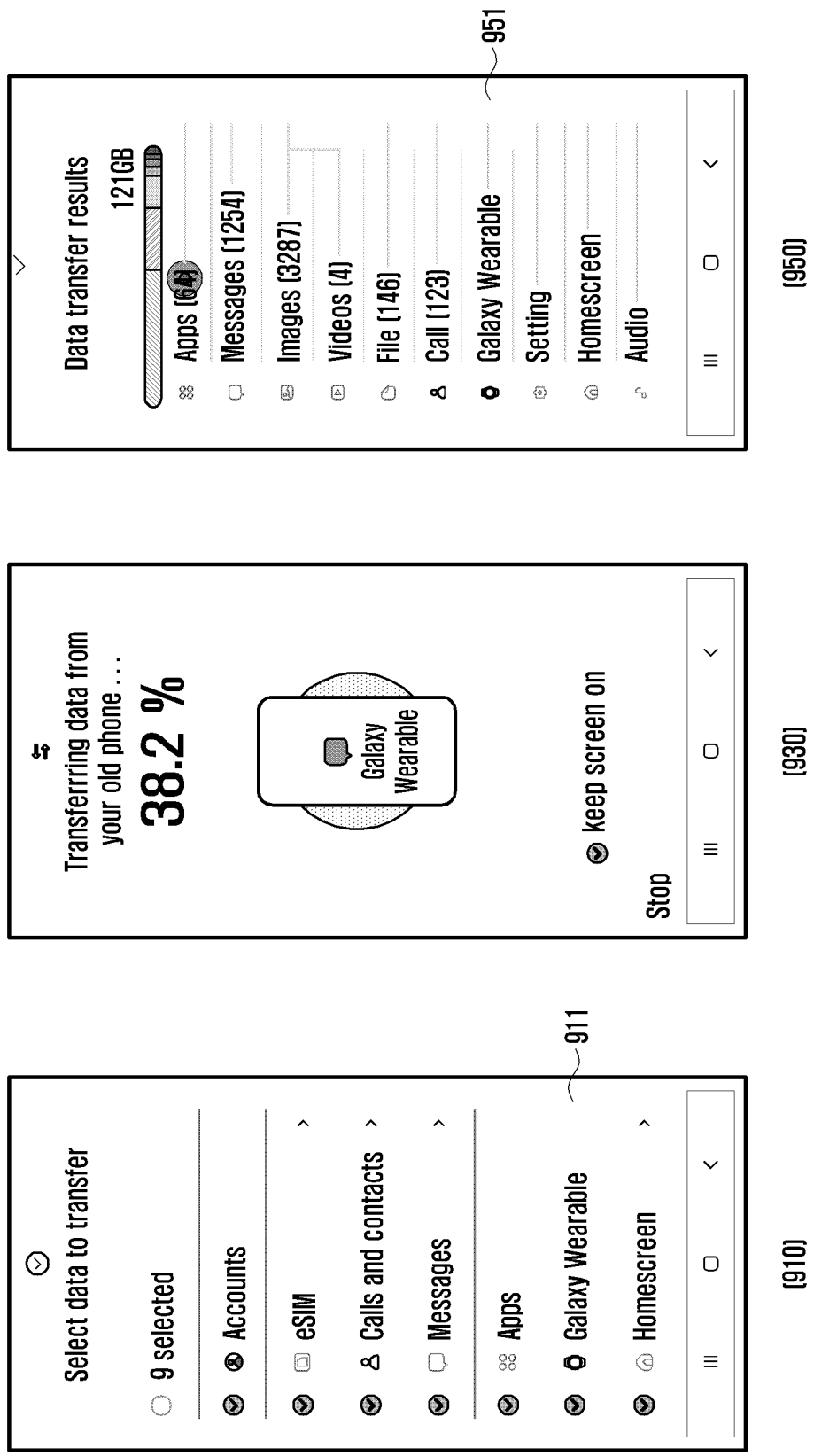
FIG. 9 is a diagram illustrating an example user interface related to data backup of an example electronic device according to various embodiments.

FIG. 9 is a diagram illustrating an example user interface related to data backup of an example electronic device according to various embodiments.

With reference to FIG. 9, the processor (e.g., the processor 120 of FIG. 1) of an electronic device (e.g., the electronic device 101 of FIG. 1) according to various embodiments may provide a first user interface 910 in connection with data backup of an external electronic device (e.g., the first electronic device 400 of FIG. 4). The first user interface 910 may be provided in connection with data backup with the first electronic device 400. Hereinafter, the electronic device 101 of FIG. 1 will be referred to as a "second electronic device 101" to distinguish it from the first electronic device 400. A user who has been using the first electronic device 400 may change (or replace) the first electronic device 400 with the second electronic device 101. Since the user has changed the first electronic device 400 to the second electronic device 101, the user may want to transfer data used in the first electronic device 400 to the second electronic device 101 as it is and use it. The user may want to transfer not only data stored in the first electronic device 400 but also data stored in a wearable device connected to the first electronic device 400 (e.g., the wearable device 200 of FIG. 2) to the second electronic device 101 and use such data. The first user interface 910 may include a data backup request item 911 stored in the wearable device 200.

In a case that the user selects the data backup request item 911, the processor 120 may provide a second user interface 930. The second user interface 930 may be displayed through a display (e.g., the display module 160 of FIG. 1) while the second electronic device 101 backs up data stored in the wearable device 200. While displaying the second user interface 930, the processor 120 may request a backup after connecting to the first electronic device 400, connect to the wearable device 200 based on the backup preparation information received from the first electronic device 400, and receive backup data from the wearable device 200. Also, while displaying the second user interface 930, the processor 120 may receive data stored in the first electronic device 400 from the first electronic device 400 as backup data.

In a case that the data backup is complete, the processor 120 may provide the third user interface 950. The third user interface 950 may include data stored in the first electronic device 400 or data 951 stored in the wearable device 200. The data 951 stored in the wearable device 200 may refer, for example, to the backup data received from the wearable device 200. The processor 120 may store the backup data in a designated area of a memory (e.g., the memory 130 of FIG. 1).

According to various embodiments, the first user interface 910, the second user interface 930, and the third user interface 950 may be execution screens of a configured application that controls data backup and restoration. The first user interface 910, the second user interface 930, and the third user interface 950 may include at least one of a text, an image, an audio, or a video.

Figure 10:
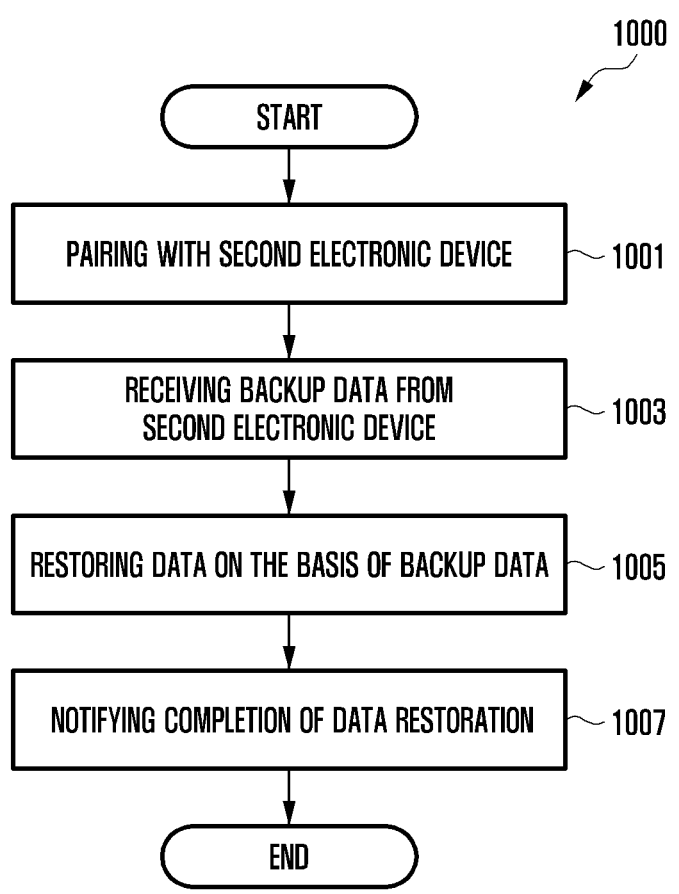
FIG. 10 is a flowchart illustrating an example data restoration method of an example wearable device according to various embodiments.

FIG. 10 is a flowchart 1000 illustrating an example data restoration method of an example wearable device according to various embodiments.

With reference to FIG. 10, in operation 1001, the processor (e.g., the processor 120 of FIG. 1) of the wearable device (e.g., the wearable device 200 of FIG. 2) according to various embodiments may be paired with a second electronic device (e.g., the electronic device 101 of FIG. 1) through a communication module (e.g., the communication module of FIG. 1). Operation 1001 may be performed after operation 611 of FIG. 6 has been performed. The processor 120 may broadcast a signal for pairing and pair with the second electronic device 101 in response to the broadcast signal. The processor 120 may be paired with the second electronic device 101 in a second communication method.

In operation 1003, the processor 120 may receive backup data from the second electronic device 101. The backup data is different from the backup preparation information, and may refer, for example, to the data itself. The backup data may include at least one of an application stored in the wearable device 200, application-related data, an image (e.g., photo), a text, a video, or an audio. In a case of transmitting the backup data, the processor 120 may be connected to the second electronic device 101 in a third communication method. The processor 120 may store the backup data in a memory (e.g., the memory 130 of FIG. 1).

In operation 1005, the processor 120 may restore data of the wearable device 200 based on the backup data.

In operation 1007, in a case that data restoration is complete, the processor 120 may notify the second electronic device 101 of data restoration completion. In a case that data restoration is complete, the processor 120 may output a data restoration completion notification (or a notification sound).

Figure 11:
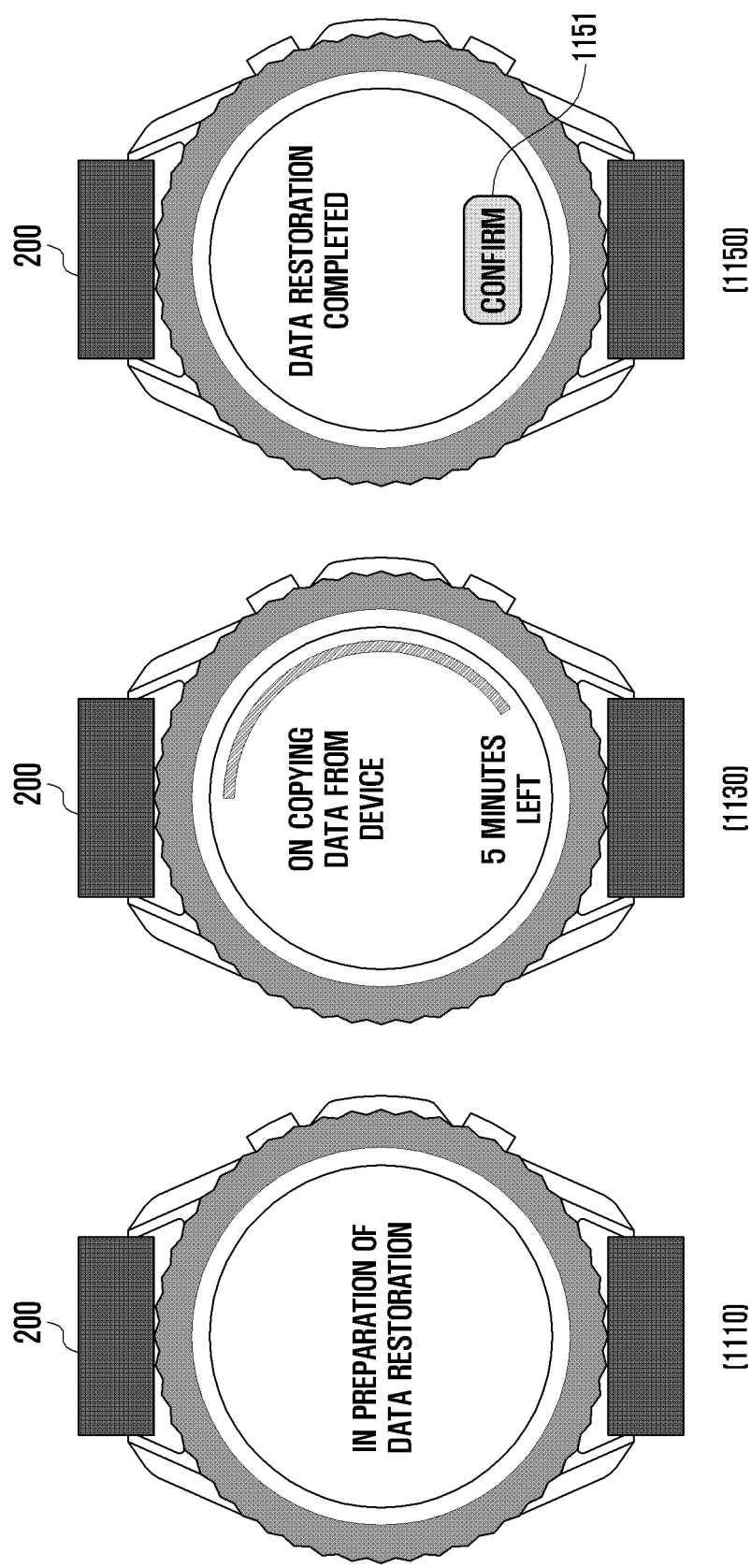
FIG. 11 is a diagram illustrating an example user interface related to data restoration of an example wearable device according to various embodiments.

FIG. 11 is a diagram illustrating an example user interface related to data restoration of an example wearable device according to various embodiments.

With reference to FIG. 11, the processor (e.g., the processor 120 of FIG. 1) of the wearable device (e.g., the wearable device 200 of FIG. 2) according to various embodiments may provide a first user interface 1110 related to data restoration. The first user interface 1110 may be provided while backup data is being received from the second electronic device (e.g., the electronic device 101 of FIG. 1). In the case that the reception of the backup data is complete, the processor 120 may provide the second user interface 1130. The processor 120 may provide the second user interface 1130 while restoring data of the wearable device 200 based on the backup data. The second user interface 1130 may include a time remaining for data restoration of the wearable device 200 (e.g., 5 minutes). In a case that data restoration is complete, the processor 120 may provide a third user interface 1150. The third user interface 1150 may include a notification indicating that data restoration is complete. In a case that the confirmation button 1151 included in the third user interface 1150 is selected, the processor 120 may notify the second electronic device 101 of data restoration completion.

According to various embodiments, the first user interface 1110, the second user interface 1130, and the third user interface 1150 may be execution screens of a configured application that controls data backup and restoration. The first user interface 1110, the second user interface 1130, and the third user interface 1150 may include at least one of a text, an image, an audio, and a video.

Figure 12:
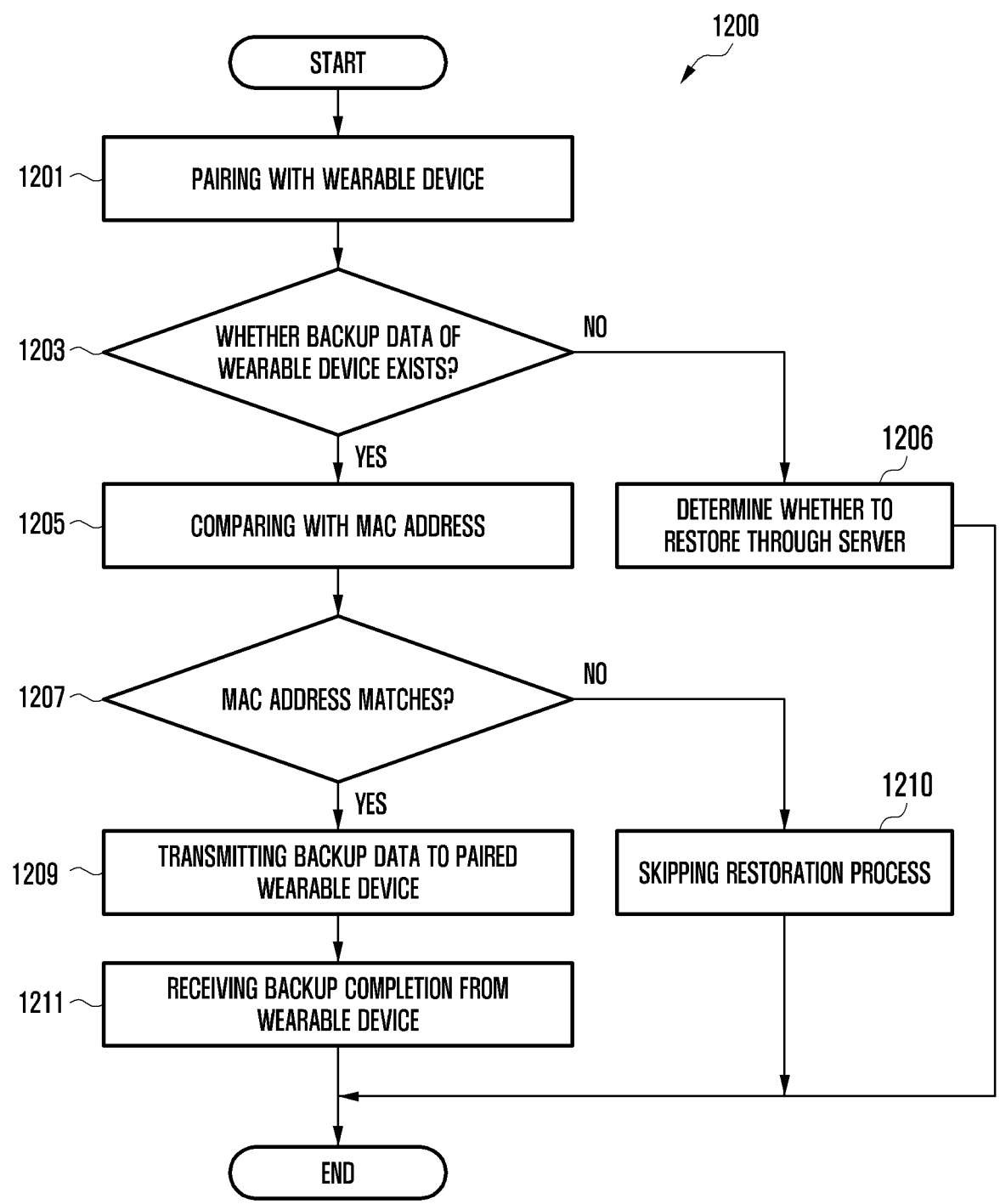
FIG. 12 is a flowchart illustrating an example data restoration method of an example electronic device according to various embodiments.

FIG. 12 is a flowchart 1200 illustrating an example data restoration method of an example electronic device according to various embodiments.

With reference to FIG. 12, in operation 1201, the processor (e.g., the processor 120 of FIG. 1) of the second electronic device (e.g., the electronic device 101 of FIG. 1) according to various embodiments may be paired with a wearable device (e.g., the wearable device 200 of FIG. 2). Operation 1201 may be performed after operation 811 of FIG. 8 has been performed. The processor 120 may receive a signal broadcast by the second communication method (e.g., Bluetooth) from the wearable device 200, and it may display information of the wearable device 200 that broadcast the signal on the display (e.g., the display module 160 of FIG. 1). In a case that the user selects the wearable device 200 displayed on the display module 160, the processor 120 may be paired with the wearable device 200.

In operation 1203, the processor 120 may determine whether backup data of the wearable device 200 exists in a memory (e.g., the memory 130 of FIG. 1). The backup data may be stored in a designated area of the memory 130. The designated area may be an area accessible to an application that controls data backup and restoration of the wearable device 200. The processor 120 may perform operation 1205 if the backup data exists, and it may perform operation 1206 if the backup data does not exist.

In a case that the backup data does not exist, in operation 1206, the processor 120 may determine whether to restore data of the wearable device 200 through a server (e.g., the server 108 of FIG. 1). For example, in a case that the backup data of the wearable device 200 is not stored in the memory 130, the backup data of the wearable device 200 may be stored in the server 108. The processor 120 may determine whether to restore data of the wearable device 200 by accessing the server 108 with the user account of the second electronic device 101. Since data restoration of the wearable device 200 through the server 108 is conventional, a detailed description is not provided here.

If the backup data exists, in operation 1205, the processor 120 may compare MAC addresses. Since the processor 120 is paired with the wearable device 200 based on the MAC address of the wearable device 200, the MAC address of the paired wearable device 200 may be identified in operation 1201. In a case of storing the backup data, the processor 120 may also store the MAC address of the wearable device 200 to be backed up. The processor 120 may identify the MAC address included in the backup data.

In operation 1207, the processor 120 may determine whether the MAC address of the paired wearable device 200 corresponds to (e.g., matches) the MAC address included in the backup data. Since the backup data includes user-related information (e.g., photo), there may be a risk of leakage to users other than the user. The processor 120 may determine whether MAC addresses match for security of the backup data. In a case that the MAC address of the paired wearable device 200 and the MAC address included in the backup data match, the processor 120 may perform operation 1209; and in a case that the MAC address of the paired wearable device 200 and the MAC address included in the backup data do not match, the processor may perform operation 1210.

In the case that the MAC address of the paired wearable device 200 does not match the MAC address included in the backup data, in operation 1210, the processor 120 may skip the data restoration process. In the case that the MAC address of the backup data stored in the memory 130 is different from the MAC address of the paired wearable device 200, the processor 120 may determine that the backup data is not the data of the paired wearable device 200, and it may not perform the data restoration process of the wearable device 200.

In the case that the MAC address of the paired wearable device 200 matches the MAC address included in the backup data, in operation 1209, the processor 120 may transmit the backup data to the paired wearable device 200. The processor 120 may transmit the backup data to the wearable device 200 through the third communication method.

In operation 1211, the processor 120 may receive a notice of backup completion (or reception completion) of the backup data from the wearable device 200. In a case that data restoration of the wearable device 200 is complete, the processor 120 may delete the backup data from the memory 130. Alternatively, in a case that the data restoration of the wearable device 200 is complete, the processor 120 may notify the user that the data restoration of the wearable device 200 is complete and delete the backup data according to a user's selection. Alternatively, in a case that data restoration of the wearable device 200 is complete, the processor 120 may transmit the backup data to the server 108 in accordance with a user's selection.

Figure 13A:
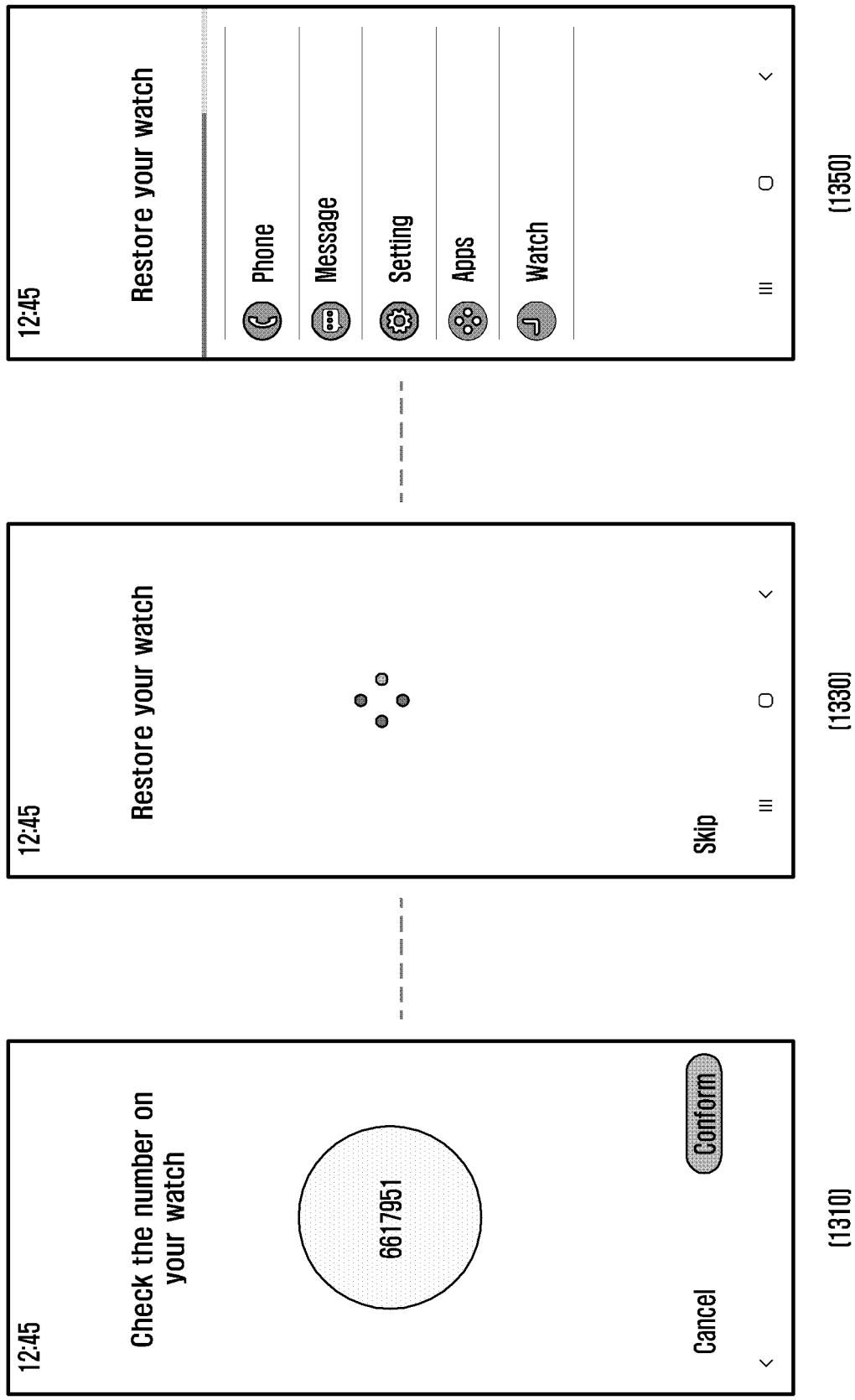
FIGS. 13A and 13B are diagrams illustrating an example user interface related to data restoration of an example electronic device according to various embodiments.
Figure 13B:
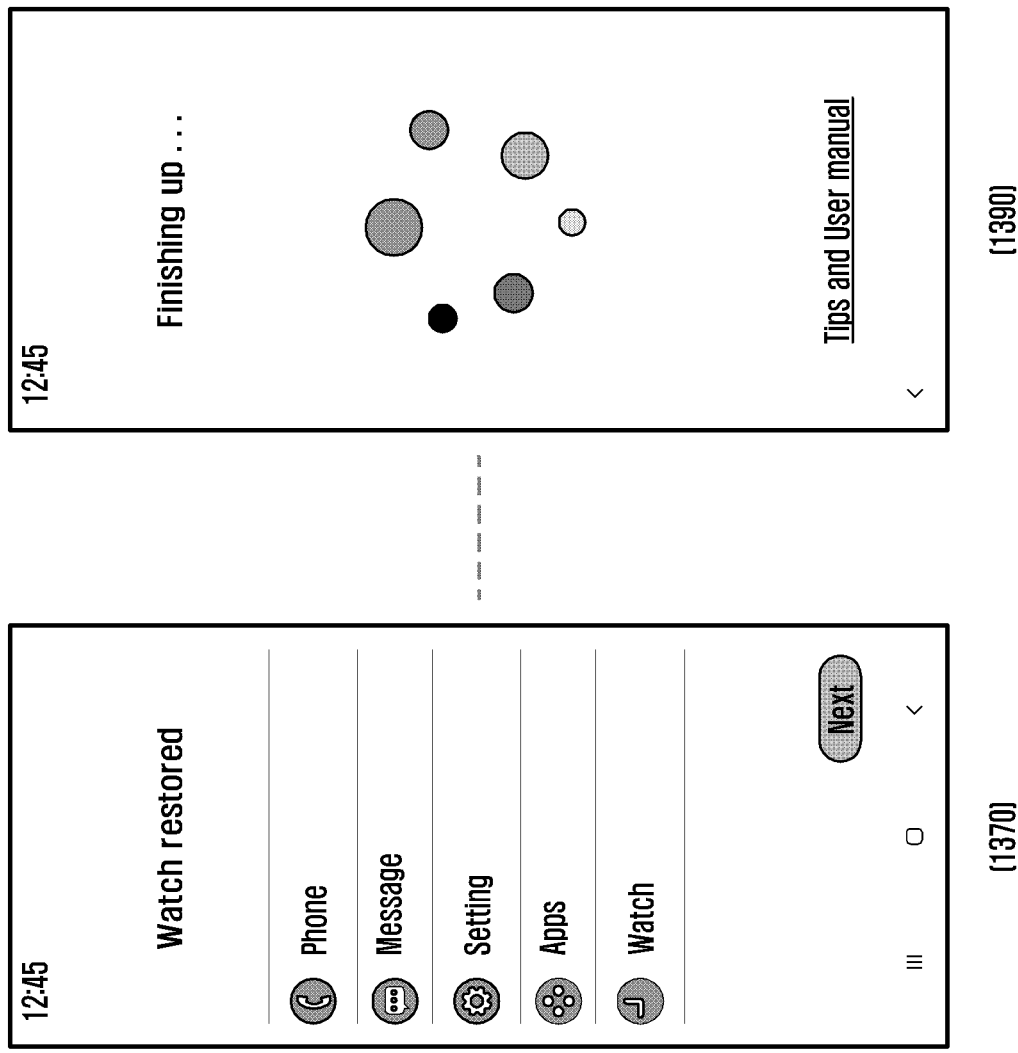

FIGS. 13A and 13B are diagrams illustrating an example user interface related to data restoration of an example electronic device according to various embodiments.

With reference to FIG. 13A, a processor (e.g., the processor 120 of FIG. 1) of the second electronic device (e.g., the electronic device 101 of FIG. 1) according to various embodiments may provide a first user interface 1310 for pairing with a wearable device (e.g., the wearable device 200 of FIG. 2). In a case that the processor 120 receives a signal for pairing from the wearable device 200, the processor 120 may display a first user interface 1310 for inputting a pin number (or pin code) of the wearable device 200 on the display (e.g., the display module 160 of FIG. 1). For example, the processor 120 may determine that the MAC address of the wearable device 200 requesting the pairing is the same as the MAC address of the backup data stored in a memory (e.g., the memory 130 of FIG. 1), and it is stored in the backup data. In a case that the pin number is included, the pin number included in the backup data may be provided to the first user interface 1310. Alternatively, in a case that the MAC address of the wearable device 200 requesting the pairing is not the same as the MAC address of the backup data stored in the memory 130 or the pin number is not included in the backup data, the processor 120 may request the user to input a pin number.

In a case that a pin number is input, the processor 120 may identify whether the backup data of the wearable device 200 is stored in the memory 130. The processor 120 may provide the second user interface 1330 while identifying whether the backup data of the wearable device 200 is stored in the memory 130. In a case that the backup data of the wearable device 200 is stored in the memory 130, the processor 120 may provide the third user interface 1350.

With reference to FIG. 13B, in a case that the backup data of the wearable device 200 is stored in the memory 130, the processor 120 may determine whether the MAC address of the paired wearable device 200 is the same as the MAC address of the backup data. In a case that the MAC address of the paired wearable device 200 is the same as the MAC address of the backup data, the processor 120 may provide the fourth user interface 1370. In the fourth user interface 1370, in a case that the user requests data restoration (e.g., selecting a next button), the processor 120 may perform data restoration of the paired wearable device 200. The processor 120 may provide a fifth user interface 1390 while restoring data of the paired wearable device 200. The fifth user interface 1390 may provide guidance that data of the paired wearable device 200 is being restored.

According to various embodiments, the first, second, third, fourth, and fifth user interfaces may be execution screens of a configured application that controls data backup and restoration. The first, second, third, fourth, and fifth user interfaces may include at least one of a text, an image, an audio, and a video.

A method of operating an electronic device (e.g., the electronic device 101 of FIG. 1) according to various embodiments of the disclosure may include establishing a communication connection with an external electronic device (e.g. the first electronic device 400 of FIG. 4) through a communication module (e.g., the communication module 190 of FIG. 1) included in the electronic device, receiving information related to a wearable device (e.g., the wearable device 200 of FIG. 2) from the external electronic device, establishing a communication connection with the wearable device based on the information, an operation of receiving backup data based on a backup request for data stored in the wearable device, storing the received backup data in a memory, and requesting a device reset to the wearable device and controlling the wearable device to be reset.

The method may include further delivering the backup request to the wearable device through the external electronic device in a case that a backup of the data stored in the wearable device and the data stored in the external electronic device is requested, or it may include further transmitting directly the backup request to the wearable device in a case that only data stored in the wearable device is backed up.

It may be configured that the communication connection with the external electronic device is a first communication method; the information related to the wearable device is received through a second communication method; the communication connection with the wearable device is a third communication method; and the device reset signal is a fourth communication method, wherein the first communication method has a faster communication speed than the second communication method, the third communication method has the same connection speed as or a different communication speed from the first communication method or the second communication method, and the fourth communication method has a slower communication speed than the first communication method to the third communication method.

The method may include further pairing with the wearable device requesting the pairing after requesting the device reset to the wearable device, determining whether the MAC address of the paired wearable device and the MAC address included in the backup data stored in the memory correspond to each other, and determining whether to perform a data restoration process based on the result of the determination.

The determination may include transmitting the backup data stored in the memory to the paired wearable device in a case that the MAC address of the paired wearable device and the MAC address included in the backup data stored in the memory correspond to each other, or skipping the data restoration process in a case that the MAC address of the paired wearable device does not correspond to the MAC address included in the backup data stored in the memory.

Various embodiments of the present disclosure disclosed in the present specification and drawings are merely presented as specific examples to explain easily the technical content of the present disclosure and help the understanding of the present disclosure, but they are not intended to limit the scope of the present disclosure. Therefore, the scope of the present disclosure should be interpreted to include all changes or modifications derived based on the technical ideals of the present disclosure in addition to the embodiments disclosed herein. While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A device comprising:
a communication module including a circuit;
memory storing instructions; and
at least one processor,
wherein the instructions, when executed by the at least one processor cause the device to perform operations comprising:
transmitting information related to the device to a first electronic device through a first communication method of the communication module in response to a request from the first electronic device;
establishing a communication connection with a second electronic device based on the information;
receiving a backup request for data stored in the device from the first electronic device;
generating backup data based on the backup request;
transmitting the generated backup data to the second electronic device through a second communication method of the communication module; and
resetting the device in a case of receiving a device reset request from the second electronic device,
wherein the second communication method has a faster communication speed than the first communication method.

2. The device of claim 1, wherein the instructions, when executed by the at least one processor cause the device to perform operations comprising:
receiving the device reset request from the second electronic device through a third communication method, and wherein
the third communication method is different from the first communication method or the second communication method.

3. The device of claim 1, wherein the instructions, when executed by the at least one processor cause the device to perform operations comprising controlling the backup data to be transmitted to the second electronic device by directly transmitting the generated backup data to the second electronic device or by transmitting the generated backup data to the second electronic device via the first electronic device.

4. The device of claim 1, wherein the instructions, when executed by the at least one processor cause the device to perform operations comprising providing a user interface relating to whether the device is to be reset in a case of receiving the device reset request, and resetting the device in a case that a reset request is input through the user interface.

5. The device of claim 1, wherein the instructions, when executed by the at least one processor cause the device to perform operations comprising:
pairing with the second electronic device after resetting the device;
receiving the backup data from the second electronic device; and
restoring data of the device based on the received backup data.

6. The device of claim 5, wherein the instructions, when executed by the at least one processor cause the device to perform operations comprising:
pairing with the second electronic device through the first communication method; and
receiving the backup data through the second communication method.

7. An electronic device comprising:
a communication module including a circuit;
memory storing instructions; and
at least one processor,
wherein the instructions, when executed by the at least one processor cause the electronic device to perform operations comprising:
establishing a communication connection with an external electronic device through a first communication method of the communication module;
receiving information related to a wearable device from the external electronic device through a second communication method;
establishing a communication connection with the wearable device through a third communication method of the communication module based on the information;
receiving backup data based on a backup request from the electronic device to the wearable device for data stored in the wearable device;
storing the received backup data in the memory; and
requesting a device reset to the wearable device,
wherein the first communication method has a faster communication speed than the second communication method, and the third communication method has the same communication speed as or a different communication speed from the first communication method or the second communication method.

8. The electronic device of claim 7, wherein the instructions, when executed by the at least one processor cause the electronic device to perform operations comprising establishing the communication connection with the wearable device based on a MAC address of the wearable device included in the information related to the wearable device.

9. The electronic device of claim 7, wherein the instructions, when executed by the at least one processor cause the electronic device to perform operations comprising transmitting the backup request to the wearable device through the external electronic device in a case that a backup of data stored in the wearable device and data stored in the external electronic device is requested, and directly transmitting directly the backup request to the wearable device in a case that only data stored in the wearable device is backed up.

10. The electronic device of claim 7, wherein the instructions, when executed by the at least one processor cause the electronic device to perform operations comprising storing the received backup data in a designated area of the memory, wherein the designated area is an area accessible to the external electronic device or a configured application that controls backup and restoration of data stored in the wearable device.

11. The electronic device of claim 7, wherein the instructions, when executed by the at least one processor cause the electronic device to perform operations comprising transmitting a device reset signal to the wearable device.

12. The electronic device of claim 7, wherein the instructions, when executed by the at least one processor cause the electronic device to perform operations comprising:
after requesting the device reset to the wearable device and the wearing device requesting a pairing, pairing with the wearable device;
determining whether a MAC address of the paired wearable device and a MAC address included in the backup data stored in the memory correspond to each other; and
determining whether to perform a data restoration process based on a result of the determination.

13. The electronic device of claim 12, wherein the instructions, when executed by the at least one processor cause the electronic device to perform operations comprising transmitting the backup data stored in the memory to the paired wearable device in a case that the MAC address of the paired wearable device and the MAC address included in the backup data stored in the memory correspond to each other, and skipping the data restoration process in a case that the MAC address of the paired wearable device does not correspond to the MAC address included in the backup data stored in the memory.

14. A method for operating an electronic device, the method comprising:
establishing a communication connection with an external electronic device through a first communication method of a communication module included in the electronic device;
receiving information related to a device from the external electronic device through a second communication method of the communication module;
establishing a communication connection with the device through a third communication method of the communication module based on the device information;
receiving backup data based on a backup request from the electronic device to the device for data stored in the device;
storing the received backup data in a memory; and
requesting a device reset to the device,
wherein the first communication method has a faster communication speed than the second communication method, and
wherein the third communication method has the same communication speed as or a different communication speed from the first communication method or the second communication method.

15. The method of claim 14, further comprising:
transmitting the backup request to the device through the external electronic device in a case that a backup of the data stored in the device and data stored in the external electronic device is requested; or
directly transmitting the backup request to the device in a case that only data stored in the device is backed up.

16. The method of claim 14, wherein:
a device reset signal is transmitted through a fourth communication method, wherein
the fourth communication method has a slower communication speed than the first communication method, the second communication method, and the third communication method.

17. The method of claim 14, further comprising:
after requesting the device reset to the device, pairing with the device requesting a pairing;
determining whether a MAC address of the paired device and a MAC address included in the backup data stored in the memory correspond to each other; and
determining whether to perform a data restoration process based on a result of the determination.

18. The method of claim 17, further comprising:
transmitting the backup data stored in the memory to the paired device in a case that the MAC address of the paired device and the MAC address included in the backup data stored in the memory correspond to each other; or
skipping the data restoration process in a case that the MAC address of the paired device does not correspond to the MAC address included in the backup data stored in the memory.

* * * * *